(12) United States Patent
Kim et al.

(10) Patent No.: US 11,838,865 B2
(45) Date of Patent: Dec. 5, 2023

(54) METHOD AND APPARATUS FOR MONITORING PHYSICAL DOWNLINK CONTROL CHANNEL IN WIRELESS COMMUNICATION SYSTEM

(71) Applicant: SAMSUNG ELECTRONICS CO., LTD., Suwon-si (KR)

(72) Inventors: Taehyoung Kim, Suwon-si (KR); Jinkyu Kang, Suwon-si (KR); Youngbum Kim, Suwon-si (KR); Jinyoung Oh, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/662,534

(22) Filed: May 9, 2022

(65) Prior Publication Data

US 2022/0264459 A1 Aug. 18, 2022

Related U.S. Application Data

(63) Continuation of application No. 17/249,563, filed on Mar. 5, 2021, which is a continuation of application
(Continued)

(30) Foreign Application Priority Data

Sep. 14, 2018 (KR) .................. 10-2018-0110465

(51) Int. Cl.
*H04W 52/02* (2009.01)
*H04L 1/00* (2006.01)
(Continued)

(52) U.S. Cl.
CPC ....... *H04W 52/0229* (2013.01); *H04L 1/0061* (2013.01); *H04W 24/08* (2013.01); *H04W 88/02* (2013.01)

(58) Field of Classification Search
CPC .................................................. H04W 52/0229
See application file for complete search history.

(56) References Cited

U.S. PATENT DOCUMENTS 8,755,348 B2 6/2014 He et al.
8,953,537 B2 2/2015 Hariharan et al.
(Continued)

FOREIGN PATENT DOCUMENTS

EP 2701322 A2 2/2014
EP 3596980 A1 1/2020
(Continued)

OTHER PUBLICATIONS

U.S. Appl. No. 62/700,470, filed Jul. 2019, Zhou.*
(Continued)

*Primary Examiner* — Hsinchun Liao

(57) ABSTRACT

A method of controlling monitoring of a physical downlink control channel (PDCCH) in user equipment (UE), the method including receiving wake up signal (WUS) configuration information from a base station; monitoring a WUS transmitted from the base station based on the WUS configuration information; detecting the WUS based on the monitoring; and monitoring at least one search space associated with the detected WUS.

16 Claims, 15 Drawing Sheets

Related U.S. Application Data

No. 16/569,404, filed on Sep. 12, 2019, now Pat. No. 10,945,209.

(51) Int. Cl.
  *H04W 24/08* (2009.01)
  *H04W 88/02* (2009.01)

(56) References Cited

U.S. PATENT DOCUMENTS

| | | | |
|---|---|---|---|
| 2014/0003312 | A1 | 1/2014 | Sergeyev et al. |
| 2014/0064170 | A1 | 3/2014 | Seo |
| 2014/0086116 | A1* | 3/2014 | Seo .............. H04J 3/1694 370/280 |
| 2014/0198663 | A1 | 7/2014 | Xu et al. |
| 2015/0098384 | A1 | 4/2015 | Deng et al. |
| 2018/0263063 | A1* | 9/2018 | Islam .............. H04W 72/0446 |
| 2018/0332533 | A1 | 11/2018 | Bhattad et al. |
| 2018/0332655 | A1 | 11/2018 | Ang et al. |

FOREIGN PATENT DOCUMENTS

| | | |
|---|---|---|
| EP | 3625997 A1 | 3/2020 |
| EP | 3596980 B1 | 4/2021 |
| EP | 3625997 B1 | 8/2021 |
| JP | 2013516871 A | 5/2013 |
| WO | 2014007938 A2 | 1/2014 |
| WO | 2018031327 A1 | 2/2018 |
| WO | 2018/075230 A1 | 4/2018 |
| WO | 2018/169649 A1 | 9/2018 |
| WO | 2018/212867 A1 | 11/2018 |

OTHER PUBLICATIONS

Ericsson, "Wake-up signal configurations and procedures for NB-IoT", 3GPP TSG-RAN WG1 Meeting #92, Feb. 26-Mar. 2, 2018, R1-1801489, 9 pages.

Qualcomm Incorporated, "Efficient monitoring of DL control channels", 3GPP TSG RAN WG1 Meeting #89, May 15-19, 2017, R1-1708796, 9 pages.

Supplementary European Search Report dated Sep. 13, 2021 in connection with European Patent Application No. 19 86 0404, 11 pages.

3GPP TS 36.211 V15.2.0 (Jun. 2018), Technical Specification, 3rd Generation Partnership Project; Technical Specification Group Radio Access Network; Evolved Universal Terrestrial Radio Access (E-UTRA); Physical channels and modulation (Release 15), Jun. 2018, 236 pages.

3GPP TS 36.213 V15.2.0 (Jun. 2018), Technical Specification, 3rd Generation Partnership Project; Technical Specification Group Radio Access Network; Evolved Universal Terrestrial Radio Access (E-UTRA); Physical layer procedures (Release 15), Jun. 2018, 541 pages.

3GPP TS 36.304 V15.0.0 (Jun. 2018), Technical Specification, 3rd Generation Partnership Project; Technical Specification Group Radio Access Network; Evolved Universal Terrestrial Radio Access (E-UTRA); User Equipment (UE) procedures in idle mode (Release 15), Jun. 2018, 52 pages.

Qualcomm Incorporated, "Efficient monitoring of DL control channels", 3GPP TSG RAN WG1 Meeting #90bis, Oct. 9-13, 2017, R1-1718135, 11 pages.

Notification of Transmittal of the International Search Report and the Written Opinion of the International Searching Authority, or the Declaration dated Dec. 23, 2019 in connection with International Patent Application No. PCT/KR2019/011872, 10 pages.

Hwang, U.S. Appl. No. 62/586,210, filed Nov. 2017.

Intellectual Property India, "Examination report under sections 12 & 3 of the Patents Act," dated Feb. 21, 2022, in connection with Indian Patent Application No. 202137012982, 5 pages.

Japan Patent Office, "Notice of Reason for Rejection" dated Apr. 19, 2022, in connection with Japanese Patent Application No. 2021-513784, 7 pages.

Vivo "Remaining issues on PDCCH CORESET", R1-1806055, 3GPP TSG RAN WG1 Meeting #93, Busan, Korea, May 21-25, 2018, 5 pages.

LG Electronics "Discussion on wake up signal in MTC", R1-1804517, 3GPP TSG RAN WG1 Meeting #92bis, Sanya, China, Apr. 16-20, 2018, 9 pages.

European Patent Office, "Communication pursuant to Article 94(3) EPC," dated Nov. 24, 2022, in connection with European Patent Application No. 19860404.3, 7 pages.

LG Electronics, "Discussion on power saving signal/channel in MTC," R1-1717279, 3GPP TSG RAN WG1 Meeting 90bis, Prague, CZ, Oct. 9-13, 2017, 12 pages.

Ericsson, "Wake-up signal for NB-IoT & eMTC," R2-1710749, 3GPP TSG-RAN WG2 #99bis, Prague, CZ, Oct. 9-13, 2017, 8 pages.

* cited by examiner

METHOD AND APPARATUS FOR MONITORING PHYSICAL DOWNLINK CONTROL CHANNEL IN WIRELESS COMMUNICATION SYSTEM

CROSS-REFERENCE TO RELATED APPLICATION

This application is a continuation of application Ser. No. 17/249,563, filed Mar. 5, 2021, which is a continuation of application Ser. No. 16/569,404, filed Sep. 12, 2019, now U.S. Pat. No. 10,945,209, which claims priority under 35 U.S.C. § 119 to Korean Patent Application No. 10-2018-0110465, filed on Sep. 14, 2018, in the Korean Intellectual Property Office, the disclosures of which are incorporated by reference herein in their entirety.

BACKGROUND

1. Field

The disclosure relates to a method and apparatus for monitoring a physical downlink control channel (PDCCH) in a wireless communication system.

2. Description of Related Art

To meet the demand due to ever-increasing wireless data traffic because the commercialization of the 4G communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency (mmWave) bands, e.g., 80 GHz bands, is being considered to attain higher data rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-centered connectivity network where humans generate and consume information into an Internet of Things (IoT) network where distributed entities such as things send, receive and process information without human intervention. Internet of Everything (IoE) technologies combined with IoT, such as big data processing technologies through connection with a cloud server, for example, have also emerged. To implement IoT, various technologies, such as sensing technology, wired/wireless communication and network infrastructure, service interfacing technology, and security technology are required, and recently, even technologies for a sensor network, Machine to Machine (M2M), and Machine Type Communication (MTC) for connection between things are being studied. Such an IoT environment may provide intelligent Internet Technology (IT) services that create a new value to human life by collecting and analyzing data generated among connected things. IoT may be applied to a variety of areas, such as a smart home, smart building, smart city, smart car or connected car, smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

With the development of the aforementioned technologies and wireless communication systems, it is possible to provide various services, and there is a need for a method to provide the services smoothly.

SUMMARY

Embodiments of the disclosure provide an apparatus and method for effectively providing services in a mobile communication system.

Additional aspects will be set forth in part in the description which follows and, in part, will be apparent from the description, or may be learned by practice of the presented embodiments of the disclosure According to an embodiment of the disclosure, a method, performed by a user equipment (UE), of controlling monitoring of a physical downlink control channel (PDCCH) may include receiving wake up signal (WUS) configuration information from a base station; monitoring a WUS transmitted from the base station based on the WUS configuration information; detecting the WUS based on the monitoring; and monitoring at least one search space associated with the detected WUS.

The at least one search space associated with the detected WUS may be determined based on a search space type, and the search space type may include at least one of a UE-specific search space (USS) or a Type-3 common search space (CSS).

The Type-3 CSS may include a CSS in which downlink control information including a cyclic redundancy check (CRC) scrambled by one of an interruption radio network temporary identifier (INT-RNTI), a slot format indication RNTI (SFI-RNTI), a transmit power control physical uplink shared channel RNTI (TPC-PUSCH-RNTI), a transmit power control physical uplink control channel RNTI (TPC-PUCCH-RNTI), a transmit power control-sounding reference symbols—RNTI (TPC-SRS-RNTI), a cell RNTI (C-RNTI), a configured scheduling RNTI (CS-RNTI), or a modulation coding scheme cell RNTI (MCS-C-RNTI) is monitored.

The at least one search space associated with the detected WUS may include all search spaces configured by the base station.

The at least one search space associated with the detected WUS may be determined based on a search space index received from the base station.

The search space index may be included in upper layer signaling, downlink control information (DCI), or media access control (MAC) control element (MAC CE) received from the base station.

The DCI or the MAC CE may include a WUS activation message.

The search space index may be included in the detected WUS.

The monitoring of the at least one search space associated with the detected WUS may include monitoring a search space not associated with the detected WUS.

The monitoring of the at least one search space associated with the detected WUS may include not monitoring a search space not associated with the detected WUS.

According to another embodiment of the disclosure, a user equipment (UE) for controlling monitoring of a physical downlink control channel (PDCCH) may include a transceiver; and a controller coupled to the transceiver and configured to receive wake up signal (WUS) configuration information from a base station, monitor a WUS transmitted from the base station based on the WUS configuration information, detect the WUS based on the monitoring, and monitor at least one search space associated with the detected WUS.

The at least one search space associated with the detected WUS may be determined based on a search space type, and the search space type may include at least one of a UE-specific search space (USS) or a Type-3 common search space (CSS).

The Type-3 CSS may include a CSS in which downlink control information including a cyclic redundancy check (CRC) scrambled by one of an interruption radio network temporary identifier (INT-RNTI), a slot format indication RNTI (SFI-RNTI), a transmit power control physical uplink shared channel RNTI (TPC-PUSCH-RNTI), a transmit power control physical uplink control channel RNTI (TPC-PUCCH-RNTI), a transmit power control-sounding reference symbols—RNTI (TPC-SRS-RNTI), a cell RNTI (C-RNTI), a configured scheduling RNTI (CS-RNTI), or a modulation coding scheme cell RNTI (MCS-C-RNTI) is monitored.

The at least one search space associated with the detected WUS may include all search spaces configured by the base station.

The at least one search space associated with the detected WUS may be determined based on a search space index received from the base station.

The search space index may be included in upper layer signaling, downlink control information (DCI), or media access control (MAC) control element (MAC CE) received from the base station.

The DCI or the MAC CE may include a WUS activation message.

The search space index may be included in the detected WUS.

The controller may be configured to monitor a search space not associated with the detected WUS.

The controller may be configured to not monitor a search space not associated with the detected WUS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
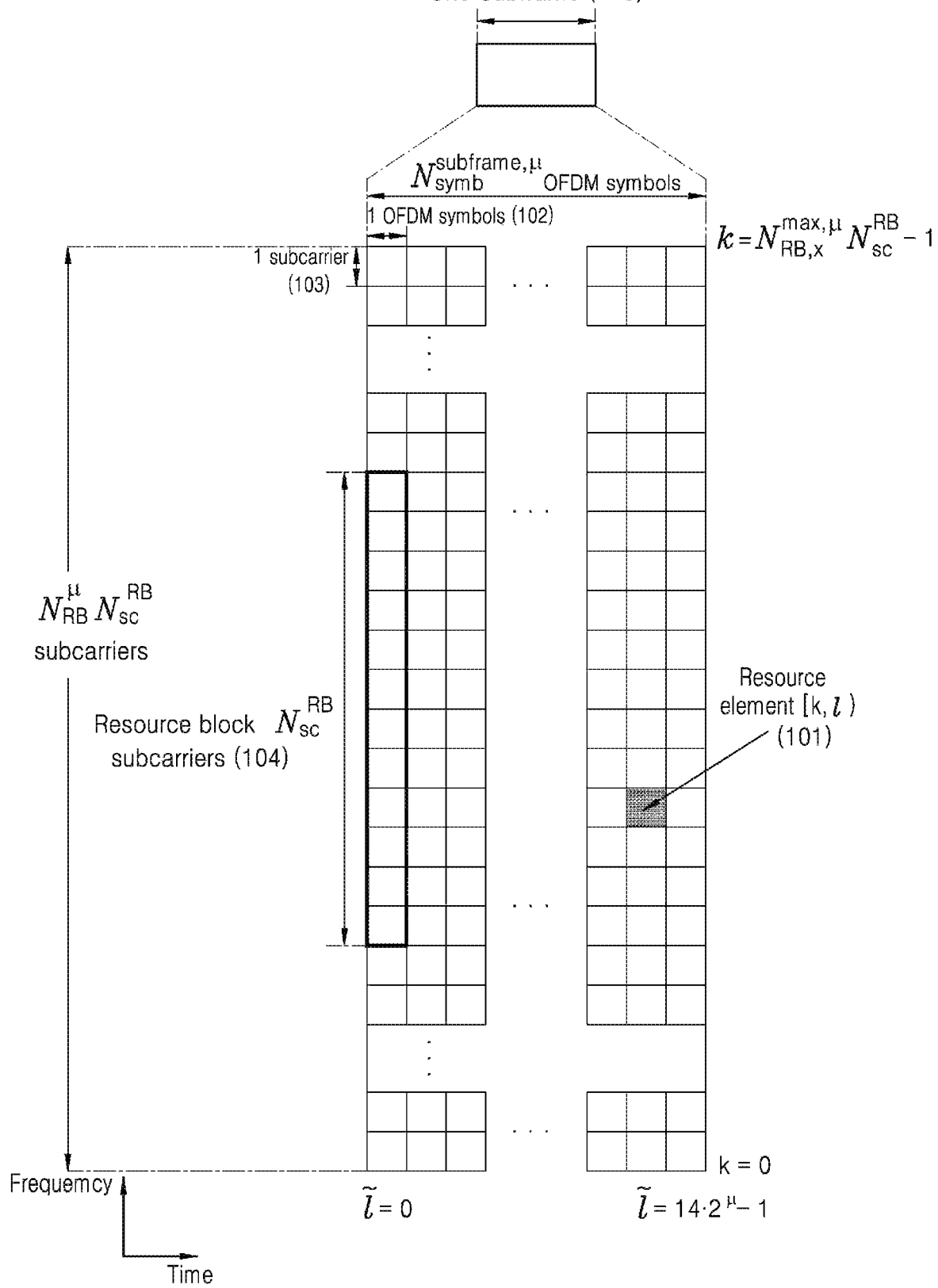
FIG. 1 shows a basic structure of the time-frequency domain in 5th generation (5G), according to an embodiment of the disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will be described in detail with reference to accompanying drawings.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments of the disclosure are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of skill in the art. Like numbers refer to like elements throughout the specification. In the description of the disclosure, when it is determined that a detailed description of related functions or configurations may unnecessarily obscure the subject matter of the disclosure, the detailed description will be omitted. Further, terms, as will be mentioned later, are defined by taking functionalities of the disclosure into account, but may vary depending on certain practices or intentions of users or operators. Accordingly, the definition of the terms should be made based on the descriptions throughout this specification. Throughout the specification, a layer may also be referred to as an entity.

Throughout the disclosure, the expression "at least one of a, b or c" indicates only a, only b, only c, both a and b, both a and c, both b and c, all of a, b, and c, or variations thereof.

In the following description, a base station is an entity for performing resource allocation for a terminal, and may be at least one of a gNode B, an eNode B, a Node B, a base station (BS), a radio access unit, a base station controller, or a network node. A terminal may include a user equipment (UE), a mobile station (MS), a cellular phone, a smart phone, a computer, or a multimedia system capable of communication. Herein, downlink (DL) refers to a radio transmission path for a signal transmitted from a BS to a UE, and uplink (UL) refers to a radio transmission path for a signal transmitted from a UE to a BS. Although the following embodiments of the disclosure will focus on the long term evolution (LTE) or LTE-Advanced (LTE-A) system as an example, they may be applied to other communication systems with similar technical backgrounds or channel types. For example, the 5th generation (5G) mobile communication technologies developed because the LTE-A, such as the 5G new radio (NR) may be included in the systems to which the embodiments of the disclosure will be applied, and the term "5G" as herein used may be a concept including the existing LTE, LTE-A, or other similar services. Furthermore, embodiments of the disclosure will also be applied to different communication systems with some modifications to such an extent that does not significantly deviate the scope of the disclosure when judged by those of skill in the art.

It will be understood that each blocks and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a greater number of components and modules. Moreover, the components and modules may be implemented to execute one or more central processing units (CPUs) in a device or security multimedia card. In embodiments of the disclosure, the module may include one or more processors.

Wireless communication systems are evolving from early systems that provide voice-oriented services to broadband wireless communication systems that provide high data rate and high quality packet data services such as 3GPP high speed packet access (HSPA), long term evolution (LTE) or evolved universal terrestrial radio access (E-UTRA), LTE-advanced (LTE-A), LTE-Pro, 3GPP2 high rate packet data (HRPD), ultra mobile broadband (UMB), and IEEE 802.16e communication standards.

As a representative example of such a broadband wireless communication system, an LTE system adopts Orthogonal Frequency Division Multiplexing (OFDM) for downlink (DL) and Single Carrier Frequency Division Multiple Access (SC-FDMA) for uplink (UL). The UL refers to a radio link for a UE or MS to transmit data or a control signal to an eNode B or BS, and the DL refers to a radio link for a BS to transmit data or a control signal to a UE or MS. Such a multiple access scheme allocates and operates time-frequency resources for carrying data or control information for respective users not to overlap each other, i.e., to maintain orthogonality, thereby differentiating each user's data or control information.

As a future communication system because the LTE, the 5G communication system needs to freely reflect various requirements from users and service providers and thus support services that simultaneously meet the various requirements. The services considered for the 5G communication system may include enhanced Mobile Broadband (eMBB), massive Machine Type Communication (mMTC), Ultra Reliability Low Latency Communication (URLL), etc.

The eMBB is aimed at providing more enhanced data rates than the LTE, LTE-A or LTE-Pro may support. For example, in the 5G communication system, the eMBB is required to provide 20 Gbps peak data rate in DL and 10 Gbps peak data rate in UL in terms of a single BS. Furthermore, the 5G communication system needs to provide increasing user perceived data rate while providing the peak data rate. To satisfy these requirements, various technologies for transmission or reception including multiple-input multiple-output (MIMO) transmission technologies are required to be more enhanced. While the LTE uses up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, in the 5G communication system, mMTC is considered to support an application service such as an Internet of Things (IoT) application service. In order for the mMTC to provide the IoT efficiently, support for access from massive number of terminals in a cell, enhanced coverage of the terminal, extended battery time, reduction in terminal price, etc., are required. Because the IoT is equipped in various sensors and devices to provide communication functions, it may be supposed to support a large number of terminals in a cell (e.g., 1,000,000 terminals/km$^2$). Furthermore, a terminal supporting the mMTC is more likely to be located in a shadow area, such as underground of a building, which might not be covered by a cell by the nature of the service, so the mMTC may require a larger coverage than expected for other services provided by the 5G communication system. A terminal supporting the mMTC needs to be a low-cost terminal, and may require quite long battery lifetime such as 10 to 15 years because the battery in the terminal is hard to be changed frequently.

Finally, Ultra-Reliable Low-Latency Communication (URLLC) is a mission critical cellular-based wireless communication service. For example, the URLLC may provide services used for remote control over robots or machinery, industrial automation, unmanned aerial vehicle, remote health care, emergency alert, etc. Accordingly, communication offered by the URLLC requires very low latency and very high reliability. For example, URLCC services needs to satisfy sub-millisecond (less than 0.5 millisecond) air interface latency and simultaneously requires error rates lower than 1 packet loss in $10^5$ packets. Hence, for the URLLC services, the 5G system needs to provide a smaller transmit time interval (TTI) than for other services, and simultaneously requires a design that allocates a wide range of resources for a frequency band to secure reliability of the communication link.

Those three services in 5G, eMBB, URLLC, and mMTC may be multiplexed in a single system for transmission. In this case, to meet different requirements for the three services, different transmission or reception schemes and parameters may be used between the services. 5G, however, is not limited to the three services.

A frame structure in a 5G system will now be described in more detail with reference to the accompanying drawings.

FIG. 1 shows a basic structure of the time-frequency domain, which is a wireless resource domain in which data or a control channel is transmitted in a 5G system, according to an embodiment of the disclosure.

In FIG. 1, the horizontal axis represents the time domain, and the vertical axis represents the frequency domain. A basic resource unit in the time and frequency domain is a resource element (RE) 101, which may be defined as an OFDM symbol 102 on the time axis and a subcarrier 103 on the frequency axis. In the frequency domain, $N_{sc}^{RB}$ (e.g., 12) consecutive REs may constitute a single resource block (RB) 104.

Figure 2:
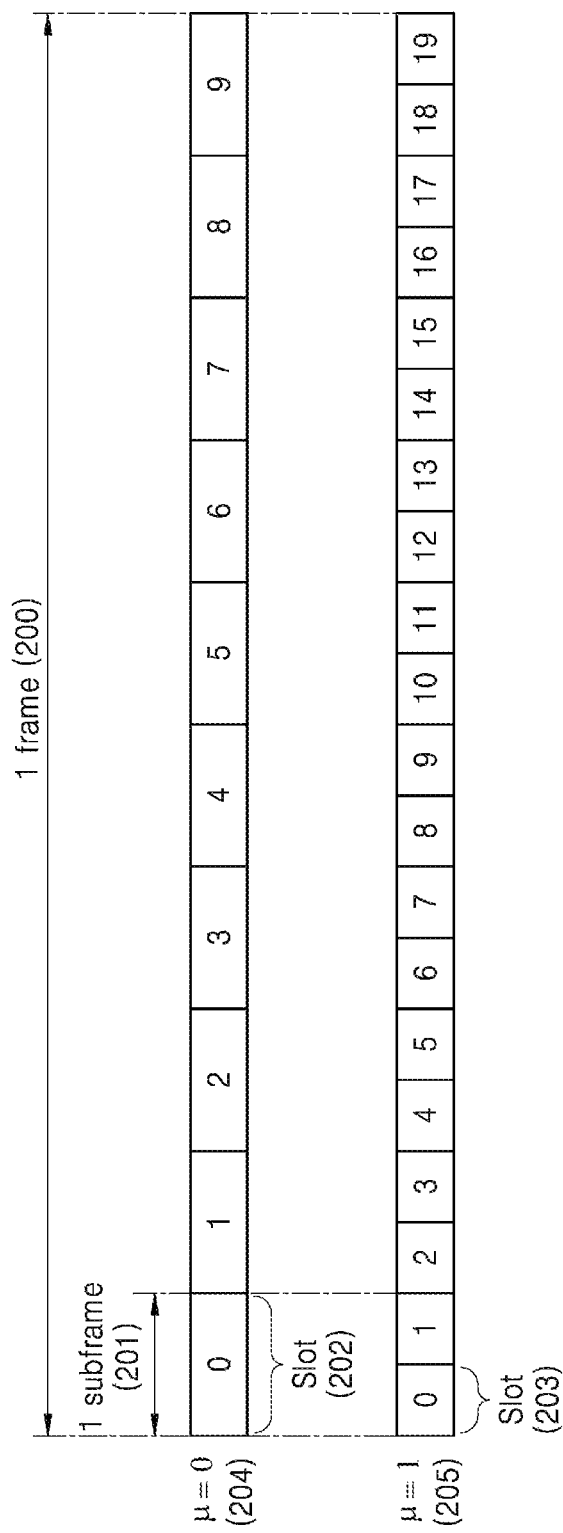
FIG. 2 shows frame, subframe, and slot structures in 5G, according to an embodiment of the disclosure.

FIG. 2 shows a slot structure considered in a 5G system, according to an embodiment of the disclosure.

In FIG. 2, an example of frame 200, subframe 201, and slot 202 structures is shown. The 1 frame 200 may be defined to be 10 milliseconds (ms). The 1 subframe 201 may be defined to be 1 ms, and thus a total of 10 subframes 201 may constitute the 1 frame 200. The 1 slot 202 and 203 may be defined to have 14 OFDM symbols (i.e., the number of symbols per 1 slot ($N_{symb}^{slot}$)=14). The 1 subframe 201 may include one or more slots 202 and 203, and the number of slots 202 and 203 per 1 subframe may vary depending on subcarrier spacing setting values μ (204 and 205). In the example of FIG. 2, the subcarrier spacing setting values are 0 and 1, i.e., μ=0 (204) and μ=1 (205). In the case of μ=0 (204), the 1 subframe 201 includes one slot 202, and in the case of μ=1 (205), the 1 subframe 201 includes two slots 203. That is, depending on the subcarrier spacing setting values μ, the number of slots per a subframe ($N_{slot}^{subframe,\mu}$) may vary and the number of slots per a frame ($N_{slot}^{frame,\mu}$) may vary accordingly. $N_{slot}^{subframe,\mu}$ and $N_{slot}^{frame,\mu}$ depending on the subcarrier spacing setting value μ may be defined as in the following Table 1.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

How to configure bandwidth part (BWP) in the 5G communication system will now be described with reference to related drawings.

Figure 3:
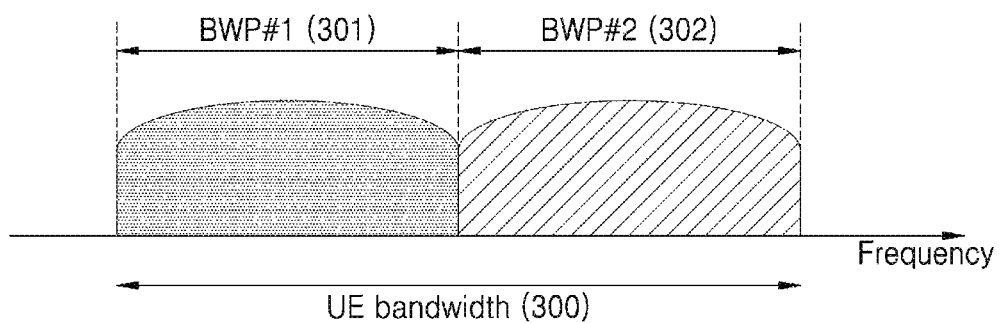
FIG. 3 shows an example of configuring bandwidth parts (BWPs) in 5G, according to an embodiment of the disclosure.

FIG. 3 shows an example of configuring BWP in a 5G communication system, according to an embodiment of the disclosure.

In an example of FIG. 3, UE bandwidth 300 is configured into two BWPs, BWP #1 301 and BWP #2 302. A BS may configure the UE with one or more BWPs, and set the following information in Table 2 for each BWP.

TABLE 2

```
BWP ::=         SEQUENCE {
  Bwp-Id              BWP-Id,
  (BWP Identifier)
  locationAndBandwidth  INTEGER (1..65536),
  (BWP Location)
  subcarrierSpacing   ENUMERATED {n0, n1, n2, n3, n4, n5},
  (Subcarrier Spacing)
  cyclicPrefix        ENUMERATED {extended}
  (Cyclic Prefix)
}
```

Methods of configuring the UE are not limited thereto, and apart from the configuration information, various parameters related to the BWP may also be configured for the UE. The information may be transmitted by the BS to the UE through upper layer signaling, e.g., Radio Resource Control (RRC) signaling. At least one of the configured one or more BWPs may be activated. Whether to activate a configured BWP may be notified by the BS to the UE semi-statically through RRC signaling or dynamically through Downlink Control Information (DCI).

In an embodiment of the disclosure, the UE may be configured by the BS with an initial BWP for initial access in a Master Information Block (MIB) before the UE is RRC connected. Specifically, the UE may receive configuration information for a control resource set (or CORESET) and search space in which a PDCCH may be transmitted for receiving system information (corresponding to remaining system information (RMSI) or system information block 1 (SIB1)) required for initial access in the MIB in an initial access process. The control resource set and search space configured in the MIB may each be regarded with identity (ID) 0. The BS may notify the UE of configuration information, such as frequency allocation information, time allocation information, numerology, etc., for control resource set #0, in the MIB. The BS may also notify the UE of configuration information, such as a monitoring periodicity and occasion for the control resource set #0, i.e., configuration information for search space #0. The UE may regard (or identify) a frequency area set to the control resource set #0 obtained from the MIB as the initial BWP for initial access. In this case, the ID of the initial BWP may be regarded as 0.

Such configuration of the BWP supported by the 5G may be used for various purposes.

In an embodiment of the disclosure, an occasion when the bandwidth supported by the UE is smaller than the system bandwidth may be addressed by the BWP configuration. For example, the BS may configure the UE with frequency location of the BWP (configuration information 2), thereby allowing the UE to transmit or receive data in the particular frequency location in the system bandwidth.

Furthermore, in an embodiment of the disclosure, for the purpose of supporting different numerologies, the BS may configure a plurality of BWPs for the UE. For example, to support data transmission and reception using both 15 kilohertz (KHz) subcarrier spacing and 30 KHz subcarrier spacing for a UE, two BWPs may be configured with 15 KHz and 30 KHz subcarrier spacing, respectively. The different BWPs may be frequency division multiplexed, and for data transmission and reception with particular subcarrier spacing, a BWP configured with the subcarrier spacing may be activated.

Moreover, in an embodiment of the disclosure, for the purpose of reducing power consumption of the UE, the BS may configure BWPs with different bandwidth sizes for the UE. For example, when a UE supports very large bandwidth, e.g., 100 MHz bandwidth, and always transmits or receives data in the bandwidth, the UE may consume very large power. In a situation where there is no traffic in particular, monitoring unnecessary DL control channel in the large 100 MHz bandwidth may be very inefficient in terms of power consumption. To reduce the power consumption of the UE, the BS may configure a BWP with relatively small bandwidth, e.g., a 20 MHz BWP, for the UE. In the situation that there is no traffic, the UE may perform monitoring in the 20 MHz BWP, and when data occurs, the UE may transmit or receive the data in the 100 MHz BWP under instructions from the BS.

In the method of configuring BWP, UEs may receive configuration information for the initial BWP in the MIB in an initial access process before being RRC connected. Specifically, the UE may be configured with a control resource set (CORESET) for a DL control channel on which DCI may be transmitted to schedule an SIB in the MIB of a physical broadcast channel (PBCH). Bandwidth of the control resource set configured in the MIB may be regarded as the initial BWP, and the UE may receive a PDSCH on which the SIB is transmitted in the initial BWP. The initial BWP may also be used for other system information (OSI), paging, or random access apart from reception of the SIB.

A synchronization signal (SS)/physical broadcast channel (PBCH) block in 5G will now be described.

An SS/PBCH block may refer to a physical layer channel block including primary SS (PSS), secondary SS (SSS), and PBCH, which are defined as follows:

PSS: a reference signal for DL time/frequency synchronization, which provides partial information of a cell ID.

SSS: a reference signal for DL time/frequency synchronization, which provides the rest of the cell ID information not provided by the PSS. It may also serve as another reference signal for demodulation of the PBCH.—PBCH: a channel for providing essential system information required for transmission or reception of data channel and control channel for UE. The essential system information may include search-space-related control information indicating radio resource mapping information of the control channel, scheduling control information for an extra data channel that transmits system information.

SS/PBCH block: SS/PBCH block is a combination of PSS, SSS, and PBCH. One or more SS/PBCH blocks may be transmitted in 5 ms, and each of the SS/PBCH block may be distinguished by an index.

The UE may detect PSS and SSS in the initial access process, and decode the PBCH. The UE may obtain the MIB from the PBCH and may be configured with control resource set #0 accordingly. The UE may assume that Demodulation Reference Signals (DMRS) transmitted in the selected SS/PBCH block and the control resource set #0 are quasi-colocated (QCL), and perform monitoring on the control resource set #0. The UE may receive system information in the DL control information transmitted in the control resource set #0. The UE may obtain random-access-channel (RACH) related configuration information required for initial access from the received system information. The UE may transmit physical RACH (PRACH) to the BS in consideration of the selected SS/PBCH index, and on reception of the PRACH, the BS may obtain information about the SS/PBCH block index selected by the UE. The BS may know that the UE selected any of the respective SS/PBCH blocks and is monitoring the control resource set #0 associated with the selected SS/PBCH.

The DCI in the 5G system will now be described in detail.

In the 5G system, scheduling information for UL data (or physical uplink shared channel (PUSCH)) or DL data (or physical downlink shared channel (PDSCH)) is transmitted from the BS to the UE in the DCI. The UE may monitor a fallback DCI format and a non-fallback DCI format for PUSCH or PDSCH. The fallback DCI format may include a fixed field predefined between the BS and the UE, and the non-fallback DCI format may include a configurable field.

The DCI may be transmitted on the PDCCH after going through channel coding and modulation processes. Cyclic redundancy check (CRC) may be appended to a DCI message (DCI) payload, and the CRC may be scrambled by a radio network temporary identifier (RNTI) that corresponds to an ID of the UE. Depending on the use of the DCI message, e.g., UE specific data transmission, power control instruction, random access response, or the like, different RNTIs may be used. In other words, the RNTI is transmitted not explicitly but in a CRC calculation process. On reception of a DCI message transmitted on the PDCCH, the UE may check CRC with an allocated RNTI, and determine that the DCI message is transmitted to the UE when the CRC check result is correct.

For example, DCI that schedules a PDSCH for system information (SI) may be scrambled by SI-RNTI. DCI that schedules a PDSCH for a random access response (RAR) message may be scrambled by RA-RNTI. DCI that schedules a PDSCH for a paging message may be scrambled by P-RNTI. DCI that notifies a slot format indicator (SFI) may be scrambled by SFI-RNTI. DCI that notifies a transmit power control (TPC) may be scrambled by TPC-RNTI. DCI that schedules UE-specific PDSCH or PUSCH may be scrambled by Cell RNTI (C-RNTI).

DCI format 0_0 may be used for the fallback DCI that schedules PUSCH, in which case the CRC may be scrambled by C-RNTI. The DCI format 0_0 with the CRC scrambled by C-RNTI may include information e.g., in the following Table 3.

TABLE 3

- Identifier for DCI formats - 1 bit
- Frequency domain resource assignment -
  $[\lceil \log_2(N_{RB}^{UL,BWP}(N_{RB}^{UL,BWP}) + 1/2 \rceil]$
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH - 2 bits
- UL/SUL (supplementary UL) indicator - 0 or 1 bit DCI format 0_1 may be used for the non-fallback DCI that schedules PUSCH, in which case the CRC may be scrambled by C-RNTI. The DCI format 0_1 with the CRC scrambled by C-RNTI may include information e.g., in the following Table 4.

TABLE 4

Carrier indicator - 0 or 3 bits
UL/SUL indicator - 0 or 1 bit
Identifier for DCI formats - 1 bit
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2 \rceil$ bits
Time domain resource assignment- 1, 2, 3, or 4 bits
VRB-to-PRB mapping (virtual resource block-to-physical resource block mapping) - 0 or 1 bit, only for resource allocation type 1.
    0 bit if only resource allocation type 0 is configured;
    1 bit otherwise.
Frequency hopping flag-0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
$2^{nd}$ downlink assignment index - 0 or 2 bits
    2 bits for dynamic HARQ-ACK codebook with two HARQ-ACK sub-codebooks;
    0 bit otherwise
TPC command for scheduled PUSCH-2 bits
SRC resource indicator -

$$\left\lceil \log_2\left(\Sigma_{k=1}^{L_{max}} \binom{N_{SRS}}{k}\right) \right\rceil \text{ or } \lceil \log_2(N_{SRS}) \rceil \text{ bits}$$

$$\left\lceil \log_2\left(\Sigma_{k=1}^{L_{max}} \binom{N_{SRS}}{k}\right) \right\rceil$$

bits for non-codebook based PUSCH transmission;
$\lceil \log_2(N_{SRS}) \rceil$ bits for codebook based PUSCH transmission.
Precoding information and number of layers-up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used for the fallback DCI that schedules PDSCH, in which case the CRC may be scrambled by C-RNTI. The DCI format 1_0 with the CRC scrambled by C-RNTI may include information e.g., in the following Table 5.

TABLE 5

- Identifier for DCI formats - 1 bit
- Frequency domain resource assignment -
  $[\lceil \log_2(N_{RB}^{UL,BWP}(N_{RB}^{UL,BWP}) + 1)/2 \rceil]$ bits
- Time domain resource assignment - X bits
- VRB-to-PRB mapping - 1 bit
- Modulation and coding scheme - 5bits
- New data indicator - 1 bit
- Redundancy version - 2 bits
- HARQ process number - 4 bits
- Downlink assignment index - 2 bits
- TPC command for scheduled PUCCH - 2 bits
- PUCCH (physical uplink control channel) resource indicator - 3 bits
- PDSCH-to-HARQ feedback timing indicator - 3 bits DCI format 1_1 may be used for the non-fallback DCI that schedules PDSCH, in which case the CRC may be scrambled by C-RNTI. The DCI format 1_1 with the CRC scrambled by C-RNTI may include information e.g., in the following Table 6.

TABLE 6

- Carrier indicator-0 or 3 bits
- Identifier for DCI formats-[1] bits
- Bandwidth part indicator-0,1 or 2 bits
- Frequency domain resource assignment
  • For resource allocation type 0, $[N_{RB}^{UL,BWP}/P]$ bits
  • For resource allocation type 1,
  $\lceil \log_2(N_{RB}^{UL,BWP}(N_{RB}^{UL,BWP} + 1)/2 \rceil$ bits
- Time domain resource assignment-1,2,3, or 4 bits
- VRB-to-PRB mapping -0 or 1 bit, only for resource allocation type 1.
  • 0 bit if only resource allocation type 0 is configured;
  • 1 bit otherwise.
- Frequency hopping flag-0 or 1 bit, only for resource allocation type 1.
  • 0 bit if only resource allocation type 0 is configured;
  • 1 bit otherwise.
- PRB bundling size indicator -0 or 1 bit
- Rate matching indicator -0,1, or 2 bits
- ZP CSI-RS trigger -0,1, or 2 bits
For transport block 1:
- Modulation and coding scheme -5 bits TABLE 6-continued

- New data indicator -1 bit
- Redundancy version -2 bits
For transport block 2:
- Modulation and coding scheme -5 bits
- New data indicator -1 bit
- Redundancy version -2 bits
- HARQ process number -4 bits
- Downlink assignment index -0 or 2 or 4 bits
- TPC command for scheduled PUCCH -2 bits
- PUCCH resource indicator -3 bits
- PDSCH-to-HARQ_feedback timing indicator -3bits
- Antenna ports -4,5 or 6 bits
- Transmission configuration indication -0 or 3 bits
- SRS request -2 bits
- CBG transmission information -0,2,4,6, or 8 bits
- CBG flushing out information -0 or 1 bit
- DMRS sequence initialization -1 bit A DL control channel in the 5G communication system will now be described in detail with reference to related drawings.

Figure 4:
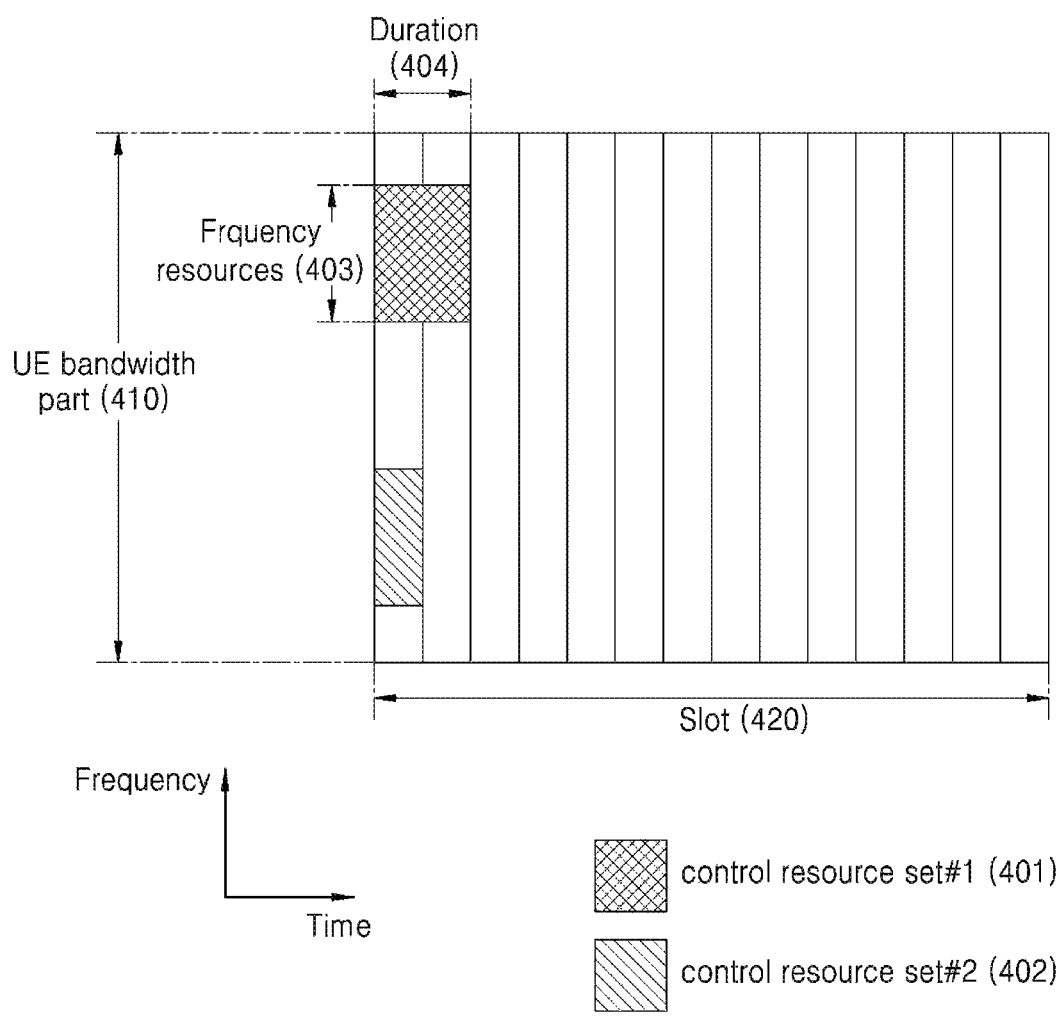
FIG. 4 shows an example of configuring control resource sets of a downlink control channel in 5G, according to an embodiment of the disclosure.

FIG. 4 shows an example of a control resource set (or CORESET) in which a DL control channel is transmitted in the 5G wireless communication system, according to an embodiment of the disclosure. In the example of FIG. 4, UE BWP 410 is configured on the frequency axis, and two control resource sets, control resource set #1 401 and control resource set #2 402, are configured on the time axis in a slot 420. The control resource set 401 and 402 may be configured in a particular frequency resource 403 in the entire UE BWP 410 on the frequency axis. One or more OFDM symbols may be configured on the time axis, and defined as control resource set duration 404. In the example of FIG. 4, the control resource set #1 401 is configured to have the control resource set duration of two symbols, and the control resource set #2 402 is configured to have the control resource set duration of one symbol.

As described above, in 5G, the control resource set may be configured by the BS for the UE through upper layer signaling, e.g., SI, MIB, or RRC signaling. Configuring the UE with the control resource set refers to providing the UE with information such as a control resource set ID, frequency location of the control resource set, length of symbols of the control resource set, etc. For example, the information may include what are listed in the following table 7.

TABLE 7

```
ControlResourceSet : : =              SEQUENCE {
  -- Corresponds to L1 parameter 'CORESET-ID'
controlResourceSetID                  controlResourceSetID,
(Control Resource Set Identity)
frequencyDomainResources              BIT STRING (SIZE (45)),
(Frequency Domain Resource Allocation Information)
duration                    INTEGER (1..maxCoReSetDuration),
(Time Domain Resource Allocation Information)
cce-REG-MappingType                   CHOICE {
(CCE-to-REG Mapping Type)
interleaved             SEQUENCE {
reg-BundleSize              ENUMERATED {n2, n3, n6},
(REG bundle size)
precoderGranularity                 ENUMERATED
{sameAsREG-bundle, allContiguousRBs},
  interleaverSize                         ENUMERATED
                                          {n2, n3, n6},
(Interleaver Size)
shiftIndex          INTEGER(0..maxNrofPhysicalResourceBlocks-1)
(Interleaver Shift)
},
nonInterleaved          NULL
},
tci-StatesPDCCH         SEQUENCE(SIZE
```

TABLE 7-continued

```
      (1..maxNrofTCI-StatesPDCCH)) OF TCI-StateId
           OPTIONAL,
      (QCL configuration information)
      Tci-PresentInDCI           ENUMERATED {enabled}
           OPTIONAL,
  }
```

In Table 7, tci-StatesPDCCH (simply called TCI state) configuration information may include information about one or more SS/PBCH block indexes having the QCL relation with the DMRS transmitted in the corresponding control resource set or channel state information reference signal (CSI-RS) indexes.

Figure 5:
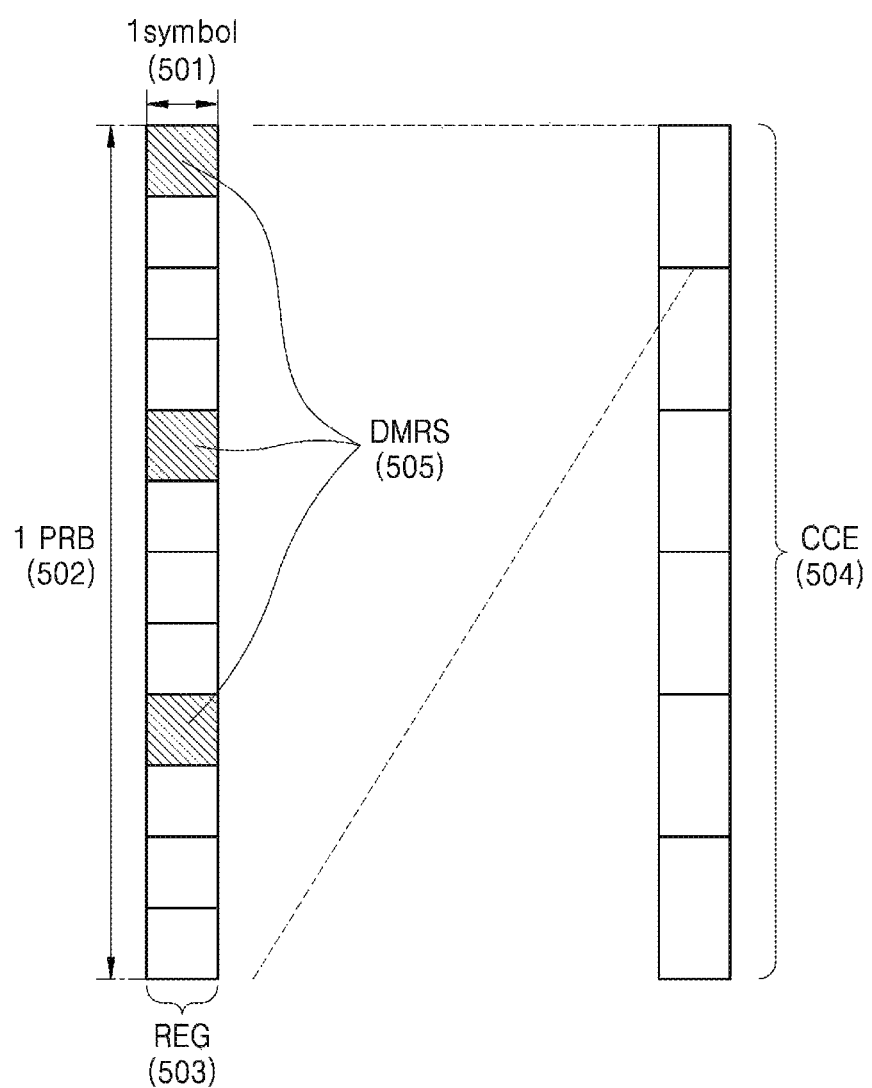
FIG. 5 shows a structure of a downlink control channel in 5G, according to some embodiment of the disclosure.

FIG. 5 shows an example of a basic unit of time and frequency resource that forms a DL control channel to be used in 5G, according to an embodiment of the disclosure. Referring to FIG. 5, a basic unit of time and frequency resource that forms a control channel is referred to as a resource element group (REG) 503. The REG 503 may be defined by one OFDM symbol 501 on the time axis and one physical resource block (PRB) 502, i.e., 12 subcarriers on the frequency axis. The BS may configure a DL control channel allocation unit by connecting REGs 503.

In FIG. 5, when the DL control channel allocation unit is called a control channel element (CCE) 504 in 5G, one CCE 504 may include a plurality of REGs 503. For example, as shown in FIG. 5, the REG 503 may include 12 REs, and when one CCE 504 includes 6 REGs 503, the one CCE 504 may include 72 REs. When the DL control resource set is configured, it may include a plurality of CCEs 504, and a particular DL control channel may be transmitted by being mapped to one or more CCEs 504 based on an aggregation level (AL) in the control resource set. The CCEs 504 in the control resource set may be distinguished by numbers, which may be allocated to the CCEs 504 in a logical mapping method.

The basic unit of the DL control channel shown in FIG. 5, i.e., the REG 503, may include both REs to which DCI is mapped and an area to which DMRS 505 that is a reference signal is mapped. As shown in FIG. 5, three DMRS 505 may be transmitted in one REG 503. The number of CCEs required to transmit the PDCCH may be 1, 2, 4, 8, or 16 depending on the AL, and different numbers of CCEs may be used to implement link adaptation of the DL control channel. For example, when AL=L, a single downlink control channel may be transmitted in L CCEs. The UE needs to detect a signal without knowing of information about the DL control channel, and search space representing a set of CCEs is defined for the blind decoding. The search space is a set of DL control channel candidates that include CCEs on which the UE needs to try decoding at a given AL, and the UE may have a plurality of search spaces because there are various ALs each making a bundle with 1, 2, 4, 8, or 16 CCEs. A search space set may be defined as a set of search spaces at all the set ALs.

The search spaces may be classified into common search spaces and UE-specific search spaces. A certain group of UEs or all the UEs may check into a common search space of the PDCCH to dynamically schedule the system information or receive common control information in the cell, such as a paging message. For example, PDSCH scheduling allocation information for transmitting an SIB including cell operator information or the like may be received by checking (detecting, or monitoring) into the common search space of the PDCCH. For the common search space, a certain group of UEs or all the UEs need to receive the PDCCH, so the common search space may be defined as a set of pre-appointed CCEs. UE-specific PDSCH or PUSCH scheduling allocation information may be received by checking into the UE-specific search space of the PDCCH. The UE-specific search space may be UE-specifically defined as a function of various system parameters and an ID of the UE.

In 5G, parameters of the search space of the PDCCH may be set by the BS for the UE in upper layer signaling (e.g., SIB, MIB, or RRC signaling). For example, the BS may configure the number of PDCCH candidates at each AL L, monitoring periodicity for the search space, monitoring occasion in symbols in the slot for the search space, a type of the search space (common search space or UE-specific search space), a combination of a DCI format to be monitored in the search space and an RNTI, control resource set index to monitor the search space, etc., for the UE. For example, the configuration information may include what are listed in the following table 8.

TABLE 8

```
SearchSpace ::=                      SEQUENCE {
    -- Identity of the search space.    SearchSpaceId = 0 identifies the SearchSpace
configured via PBCH (MIB) or ServingCellConfigCommon.
    SearchSpaceId                    SearchSpaceId,
    (Search Space Identifier)
    controlResourceSetId             ControlResourceSetId,
    (Control Resource Set Identity)
    monitoringSlotPeriodicityAndOffset    CHOICE {
    (Monitoring Slot Level Periodicity)
    S11                              NULL,
    S12                              INTEGER (0..1),
    S14                              INTEGER (0..3),
    S15                              INTEGER (0..4),
    S18                              INTEGER (0..7),
    S110                             INTEGER (0..9),
    S116                             INTEGER (O..15),
    S120                             INTEGER (0..19)
    }                                OPTIONAL,
    Duration(Monitoring Length)      INTEGER (2..2559)
    monitoringSymbolsWithinSlot      BIT STRING (SIZE (14))
```

TABLE 8-continued

```
    OPTIONAL
(Monitoring Symbol in Slot)
nrofCandidates                    SEQUENCE {
(The Number of PDCCH Candidates for each AL)
aggregationLevel1                 ENUMERATED {n0, n1, n2, n3, n4, n5, n6, n8},
aggregationLevel2                 ENUMERATED {n0, n1, n2, n3, n4, n5, n6, n8},
aggregationLevel4                 ENUMERATED {n0, n1, n2, n3, n4, n5, n6, n8},
aggregationLevel8                 ENUMERATED {n0, n1, n2, n3, n4, n5, n6, n8},
aggregationLevel6                 ENUMERATED {n0, n1, n2, n3, n4, n5, n6, n8},
},
searchSpaceType                   CHOICE {
(Search Space Type)
    -- Configures this search space as common search space (CSS) and DCI formats to
monitor.
    Common                        SEQUENCE {
    (Common Search Space)
        }
    ue-Specific                   SEQUENCE {
    (UE-Specific Search Space)
        -- Indicates whether the UE monitors in this USS for DCI formats 0-0 and 1-0 or
for formats 0-1 and 1-1.
        formats      ENUMERATED {formats0-0-And-1-0, formats0-1-And-1-1},
    ...
}
```

Based on the configuration information, the BS may configure the UE with one or more search space sets. In an embodiment of the disclosure, the BS may configure the UE with search space set 1 and search space set 2, configure the UE to monitor DCI format A scrambled by X-RNTI in the search space set 1 in the common search space and monitor DCI format B scrambled by Y-RNTI in the search space set 2 in the UE-specific search space.

The configuration information may indicate that there is one or more search space sets in the common or UE-specific search space. For example, search space set #1 and search space set #2 may be set as the common search space, and search space set #3 and search space set #4 may be set as the UE-specific search space.

In the common search space, the following combinations of DCI formats and RNTIs may be monitored. It is, of course, not limited to the following example.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. It is, of course, not limited to the following example.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The enumerated RNTIs may follow the following definitions and uses.

C-RNTI (Cell RNTI): used for UE-specific PDSCH scheduling

TC-RNTI (Temporary Cell RNTI): used for UE-specific PDSCH scheduling

CS-RNTI (Configured Scheduling RNTI): used for semi-statically configured UE-specific PDSCH scheduling RA-RNTI (Random Access RNTI): used for PDSCH scheduling in a random access process P-RNTI (Paging RNTI): used for scheduling a PDSCH on which paging is transmitted SI-RNTI (System Information RNTI): used for scheduling a PDSCH on which system information is transmitted INT-RNTI (Interruption RNTI): used for indicating whether to puncture the PDSCH TPC-PUSCH-RNTI (Transmit Power Control for PUSCH RNTI): used for indicating power control indication for a PUSCH TPC-PUCCH-RNTI (Transmit Power Control for PUCCH RNTI): used for indicating power control indication for a PUCCH TPC-SRS-RNTI (Transmit Power Control for SRS RNTI): used for indicating power control indication for an SRS The aforementioned DCI formats may conform to the following definitions in Table 9.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, with control resource set P and search space set s, a search space at AL L may be expressed as in the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{Equation 1}$$

L: Aggregation Level $n_{CI}$: Carrier Index $N_{CCE,P}$: total number of CCEs existing in Control Resource Set p $n^{\mu}_{s,f}$: Slot Index $M^{(L)}_{p,s,max}$: number of PDCCH candidates for Aggregation Level L $m_{s_nCI}=0, \ldots, M^{(L)_{p,s,max}}-1$: PDCCH Candidate Index for Aggregation Level L $i=0, \ldots, L-1$ $Y_{p,n_s,f}^{\mu}=(A_p \cdot Y_{p,n_s,f-1}^{\mu}) \mod D, Y_{p,-1}=n_{RNTI} \neq 0,$ $A_0=39827, A_1=39829, A_2=39839, D=65537$ $n_{RNTI}$: UE identifier Value of Y_(p, $n^{\mu}_{s,f}$) may correspond to 0 for common search space.

Value of Y_(p, $n^{\mu}_{s,f}$) may correspond to a value that changes according to UE Identity (C-RNTI or ID configured by the BS for the UE) and time index for UE-specific search space.

As it is possible to configure a plurality of search space sets with different parameters (e.g., the parameters in Table 8) in 5G, the UE may monitor a different search space set every time. For example, when the search space set #1 is configured with X-slot periodicity and the search space set #2 is configured with Y-slot periodicity, where X and Y are different, the UE may monitor both the search space set #1 and the search space set #2 in a particular slot, and monitor one of the search space set #1 and the search space set #2 in another particular slot.

When a plurality of search space sets are configured for the UE, the following conditions may be taken into account in a method for determining a search space set to be monitored by the UE.

[Condition 1: Restriction on the Maximum Number of PDCCH Candidates]

The number of PDCCH candidates to be monitored per slot does not exceed $M^{\mu}$. $M^{\mu}$ may be defined as the maximum number of PDCCH candidates per slot on a cell configured with $15 \cdot 2^{\mu}$ kHz subcarrier spacing, as in the following Table 10.

TABLE 10

| μ | Maximum number of PDCCH candidates per slot and per serving cell ($M^{\mu}$) |
|---|---|
| 0 | 44 |
| 1 | 36 |
| 2 | 22 |
| 3 | 20 |

[Condition 2: Restriction on the Maximum Number of CCEs]

The number of CCEs constituting the entire search space (the entire search space herein refers to an entire CCE set corresponding to a union region of a plurality of search space sets) per slot does not exceed $C^{\mu}$. $C^{\mu}$ may be defined as the maximum number of CCEs per slot on a cell configured with $15 \cdot 2^{\mu}$ kHz subcarrier spacing, as in the following Table 11.

TABLE 11

| μ | Maximum number of CCEs per slot and per serving cell ($C^{\mu}$) |
|---|---|
| 0 | 56 |
| 1 | 56 |
| 2 | 48 |
| 3 | 32 |

For convenience of explanation, a situation that satisfies both conditions 1 and 2 at a particular time is defined to be "condition A". Accordingly, failing to satisfy the condition A may mean that at least one of the conditions 1 or 2 is not satisfied.

Depending on how the BS configures the search space sets, there may be an occasion when the condition A is not satisfied at a particular time. On the occasion when the condition A is not satisfied at the particular time, the UE may select and monitor some of the search space sets, which are configured to satisfy the condition A at the time, and the BS may transmit a PDCCH in the selected search space set.

In the 5G communication system, a method for controlling whether to monitor the PDCCH through Layer 1 (L1) signaling for the purpose of reducing power consumption of the UE is being discussed. L1 signaling may include e.g., a signal indicating the UE to perform monitoring on the PDCCH (called a wake-up signal (WUS)) or not to perform monitoring on the PDCCH (called a go-to-sleep signal (GTS)). For example, the BS may transmit the WUS to the UE, and the UE may then perform monitoring on the PDCCH after detecting the WUS. In another example, the BS may transmit the GTS to the UE, and the UE may not perform monitoring on the PDCCH for a certain period of time, after detecting the GTS.

L1 signals for controlling monitoring operation for the PDCCH are collectively called a "low power mode indicator (or power saving mode indicator, WUS (Wake Up Signal), GTS (Go To Sleep), MTS (Monitoring Termination Signal)". The BS may notify the UE of configuration information for the low power mode indicator, and the UE may perform monitoring on the low power mode indicator based on the configuration information for the low power mode indicator and control the subsequent monitoring operation for the PDCCH differently.

The disclosure proposes a method for configuring the WUS and associated BS and UE operations. It may include a low power mode indicator configuration method (e.g., time/frequency/periodicity configuration method or BWP configuration method), physical layer channel structure for transmitting the low power mode indicator (a sequence-based transmission method, or a DCI-based transmission method), method for monitoring the low power mode indicator (activation/deactivation method, or UE-request-based activation method), a method for monitoring the PDCCH when the UE detects the low power mode indicator, and a UL control channel and data channel transmission method while the UE is monitoring the low power mode indicator.

With the proposed WUS transmission method and the subsequent PDCCH monitoring method performed by the UE, the UE may consume least power for PDCCH monitoring.

Embodiments of the disclosure will now be described in conjunction with accompanying drawings. Although the following embodiments of the disclosure will focus on the 5G system as an example, they may be equally applied to other communication systems with similar technical backgrounds or channel types. For example, they may be applied to LTE or LTE-A mobile communication and future mobile communication technologies beyond 5G. Furthermore, embodiments of the disclosure will also be applied to other communication systems through some modifications to an extent that does not significantly deviate from the scope of the disclosure when judged by those of skill in the art.

In the description of the disclosure, when it is determined that a detailed description of related functions or configurations may unnecessarily obscure the subject matter of the disclosure, the detailed description will be omitted. Further, terms, as will be mentioned later, are defined by taking functionalities of the disclosure into account, but may vary depending on certain practices or intentions of users or operators. Accordingly, the definition of the terms should be made based on the descriptions throughout this specification.

Embodiment 1

The embodiment 1 of the disclosure proposes a method for transmitting or receiving the low power mode indicator. Specifically, a method for the BS to perform configuration required to transmit the low power mode indicator to the UE, a method for notifying the configuration information, a method for the UE to receive configuration information for the low power mode indicator from the BS, and a method for performing monitoring on the low power mode indicator based on the configuration information are proposed.

The low power mode indicator may include the following representative signals or signals to enable the following functions.

Wake up signal (WUS)
a signal indicating the UE to perform monitoring on the PDCCH. For example, the BS may transmit the WUS to the UE, and the UE may then perform monitoring on the PDCCH from the moment when the WUS is detected.

Go to sleep signal (GTS)
a signal indicating the UE to not perform monitoring on the PDCCH. For example, the BS may transmit the GTS to the UE, and the UE may not perform monitoring on the PDCCH for a certain period of time, after detecting the GTS.

In the following description of a specific embodiment of the disclosure, the low power mode indicator will be regarded as the WUS or the GTS. Embodiments of the disclosure may be equally applied to any common low power mode indicator that plays the same role as the WUS or the GTS. The following embodiments of the disclosure may be performed in combination.

Embodiment 1-1

Figure 6:
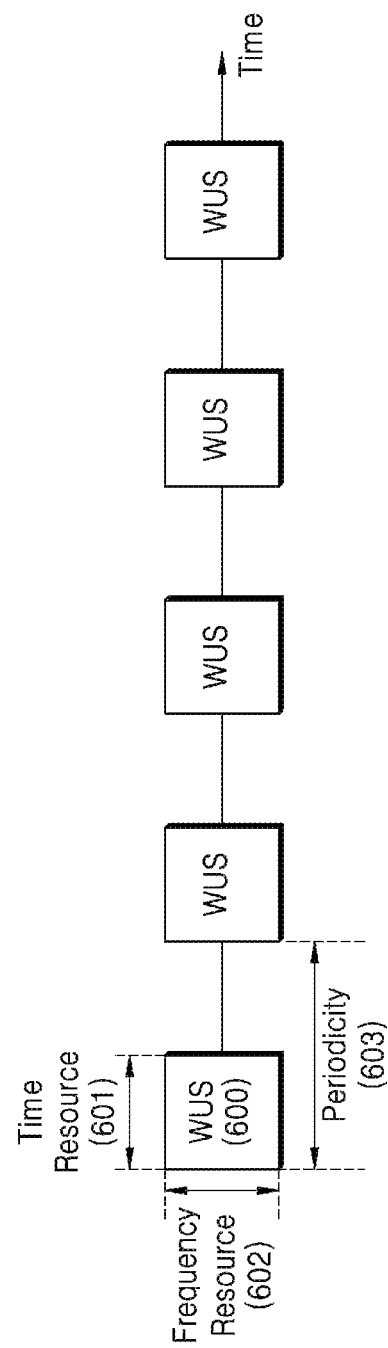
FIG. 6 shows an example of configuring wake-up signal (WUS) transmission, according to an embodiment of the disclosure.

FIG. 6 shows a WUS transmission method, according to the embodiment 1-1 of the disclosure. The BS may configure the UE with time resources 601, frequency resources 602, transmission periodicity 603 through upper layer signaling (e.g., MIB, SIB, or RRC signaling). The WUS 600 may be transmitted from the BS to the UE based on the configured time resource 601, frequency resource 602, transmission periodicity 603, and monitoring duration or monitoring window. The WUS 600 may correspond to a predefined particular sequence. For example, the WUS 600 may correspond to one of Zadoff-Chu (ZC) sequence, m sequence, and Gold sequence. It is, of course, not limited thereto.

Furthermore, in an embodiment of the disclosure, the WUS 600 may be defined UE-specifically. For example, the sequence of the WUS 600 may be determined by the UE ID (e.g., C-RNTI), or a UE-specific ID set by the BS for the UE. The UE may receive configuration information for the WUS 600 and monitor the WUS 600 to be transmitted in the configured time resource 601 and frequency resource 602 with every periodicity 603.

The UE may be notified from the BS of configuration information for the time resource 601, frequency resource 602, transmission periodicity 603, etc., through upper layer signaling (e.g., MIB, SIB, or RRC signaling), and may perform monitoring on the WUS in the configured resources.

For the WUS, at least one of the following parameters may be set.
time resource allocation information
frequency resource allocation information
monitoring periodicity and occasion
monitoring interval or length
transmission configuration indicator (TCI) state, QCL configuration information
sequence ID Embodiment 1-2

Figure 7:
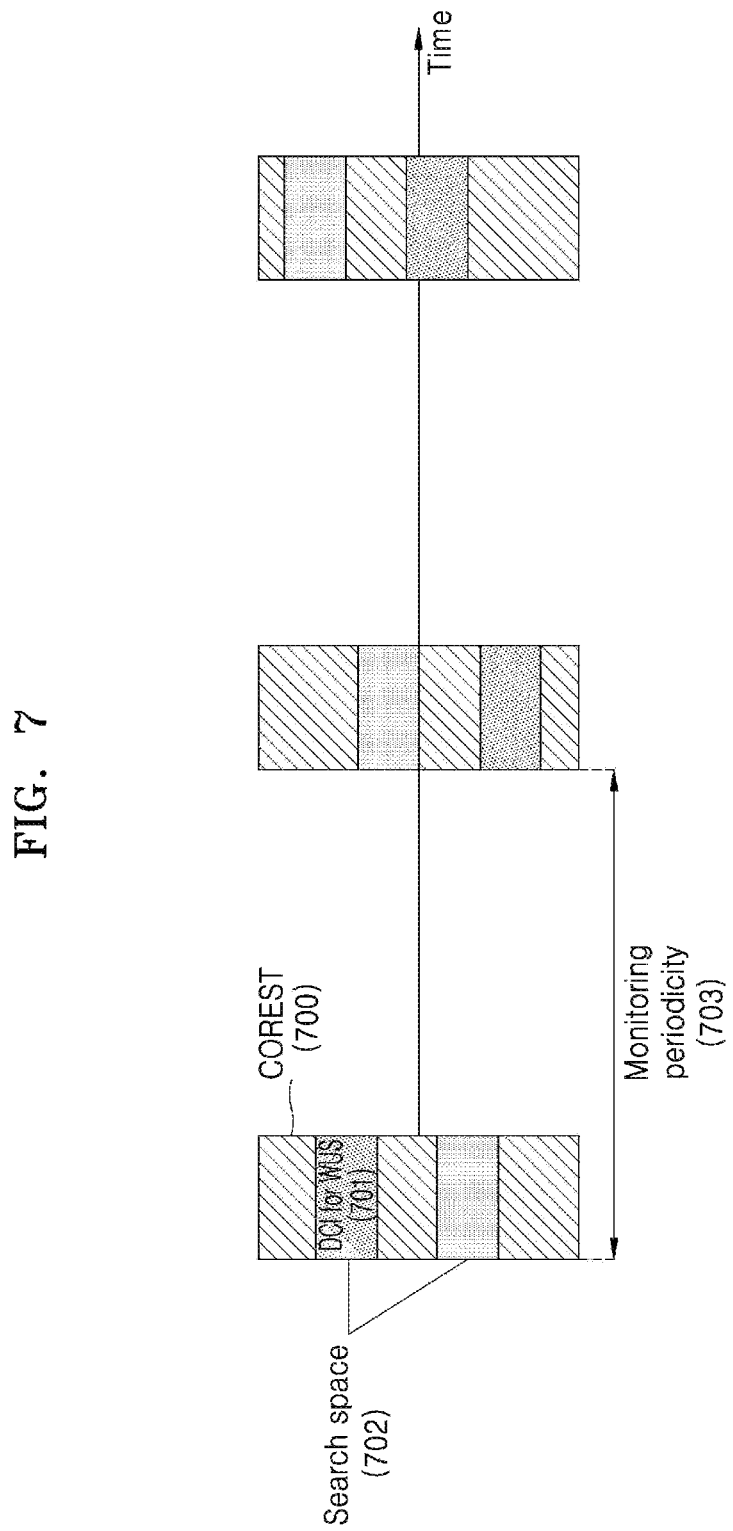
FIG. 7 shows an example of configuring WUS transmission, according to another embodiment of the disclosure.

FIG. 7 shows a WUS transmission method, according to the embodiment 1-2 of the disclosure. Although FIG. 7 is focused on the WUS, the embodiment of the disclosure may be equally applied to a signal corresponding to any other common low power mode indicators that serve the same role as the WUS. The BS may transmit DCI 701 for WUS to the UE.

As shown in FIG. 7, the BS may configure the UE with a control resource set (or CORESET) 700 and search space 702 for transmitting the DCI 701 for WUS.

Embodiment 1-2-1

A method for the BS to configure the UE with the control resource set 700 for transmitting the DCI 701 for WUS may be as follows:

The control resource set 700 for transmitting the DCI 701 for WUS may correspond to a control resource set configured by the BS for the UE in the MIB (i.e., control resource set with ID 0 or control resource set #0). The search space for the DCI 701 for WUS may always be associated with the control resource set #0. That the search space is associated with a control resource set means that the corresponding search space is defined in the associated control resource set (this may be configured by assigning the value of parameter ControlResourceSetId among RRC parameters for search space (SearchSpace IEs) to an ID of the control resource set to be associated).

Alternatively, the control resource set 700 for transmitting the DCI 701 for WUS may be configured by the BS for the UE through upper layer signaling, e.g., RRC signaling, with the parameters in Table 7. The search space for the DCI 701 for WUS may always be associated with any control resource set configured through the RRC signaling.

Furthermore, another method for the BS to configure the UE with the control resource set 700 for transmitting the DCI 701 for WUS may be as follows:

The control resource set 700 for transmitting the DCI 701 for WUS may exist in a particular BWP. For example, it may be set in the initial BWP configured in the MIB. Alternatively, in an embodiment of the disclosure, the control resource set 700 for transmitting the DCI 701 for WUS may exist in the initial BWP configured in an SIB. In another embodiment of the disclosure, the control resource set 700 for transmitting the DCI 701 for WUS may exist in a BWP corresponding to a default BWP among the BWPs configured through upper layer signaling, e.g., RRC signaling. In an embodiment of the disclosure, the default BWP may correspond to a BWP to which the UE returns when the UE detects no DCI for a period of time set through upper layer signaling (bwp-InactivityTimer).

In an embodiment of the disclosure, the BS may configure the UE with a BWP for monitoring the control resource set 700 for transmitting the DCI 701 for WUS through upper layer signaling, e.g., RRC signaling. The search space for the DCI 701 for WUS may always be associated with a control resource set that exists in the particular BWP.

Alternatively, the control resource set 700 for transmitting the DCI 701 for WUS may exist every BWP. The search space for the DCI 701 for WUS may be associated with a control resource set existing in an arbitrary BWP configured through the RRC signaling.

Furthermore, another method for the BS to configure the UE with the control resource set 700 for transmitting the DCI 701 for WUS may be as follows:

The control resource set 700 for transmitting the DCI 701 for WUS may correspond to a control resource set configured as common search space. The type of search space for the DCI 701 for WUS may be associated with a control resource set configured as common search space.

The control resource set 700 for transmitting the DCI 701 for WUS may correspond to a control resource set configured as UE-specific search space. The type of search space for the DCI 701 for WUS may be associated with a control resource set configured as the UE-specific search space.

Furthermore, another method for the BS to configure the UE with the control resource set 700 for transmitting the DCI 701 for WUS may be as follows:

Of configuration parameters for the control resource set 700 for transmitting the DCI 701 for WUS, a particular parameter may be set to a particular value. For example, among the parameters in Table 7 for the control resource set 700, precoderGranularity may be set to allContiguousRBs (which may be understood that DMRS of the control resource set is set to wideband RS). When precoderGranularity is set to allContiguousRBs, the UE may assume that the same precoding is applied to all DMRSs transmitted in consecutive RBs in the control resource set.

Embodiment 1-2-2

As shown in FIG. 7, the BS may configure the UE with the search space 702 for transmitting the DCI 701 for WUS through upper layer signaling (e.g., MIB, SIB, or RRC signaling). For example, the BS may set parameters for the search space as described in Table 8 (i.e., monitoring periodicity and offset in slots, monitoring occasion in symbols, the number of PDCCH candidates for each AL, a type of search space, a DCI format, etc.).

In a method for the BS to configure the UE with the search space 702 for monitoring the WUS, the BS may set the type of search space in at least one of the following methods:

[Method 1]

The type of search space may be set to common search space (CSS), and $Y\_(p, n^H_{s,f})$ among the parameters for determining the search space may correspond to 0. Accordingly, the DCI for WUS may be transmitted in the common search space. The UE may monitor the DCI for WUS in the common search space.

[Method 2]

The type of search space may be set to CSS or group common search space (GCSS), and $Y\_(p, n^H_{s,f})$ among the parameters for determining the search space may be determined by a group common RNTI (e.g., GC-RNTI). Accordingly, the DCI for WUS may be transmitted in the search space defined in common in the group. The UE may monitor the DCI for WUS in the group-common search space.

[Method 3]

The type of search space may be set to UE-specific search space (USS), and $Y\_(p, n^H_{s,f})$ may have a value that changes according to the UE ID (e.g., C-RNTI or an ID configured by the BS for the UE) and time index. Accordingly, the DCI for WUS may be transmitted in the search space defined to be UE-specific. The UE may monitor the DCI for WUS in the UE-specific search space.

In a method for the BS to configure the UE with the search space 702 for monitoring the WUS, the BS may set a DCI format to be monitored in the search space in at least one of the following methods:

[Method 1]

The BS may configure a particular DCI format defined for the purpose of WUS transmission (e.g., DCI format 0-2 or 1-2, or DCI format 3) to be monitored. The DCI format for WUS may be scrambled by a WUS-RNTI. The UE may perform reception on assumption that the DCI format is scrambled by the WUS-RNTI. Accordingly, the DCI format for WUS maybe descrambled by the WUS-RNTI.

[Method 2]

The BS may configure the DCI format 0-0 or 1-0 scrambled by the RNTI for WUS (e.g., the WUS-RNTI) to be monitored. When configured with the WUS-RNTI, the UE may monitor the DCI scrambled by the WUS-RNTI for the DCI format 0-0 or 1-0.

[Method 3]

The BS may configure the DCI format 0-1 or 1-1 scrambled by the RNTI for WUS (e.g., the WUS-RNTI) to be monitored. When configured with the WUS-RNTI, the UE may monitor the DCI scrambled by the WUS-RNTI for the DCI format 0-1 or 1-1.

Embodiment 1-3

The BS may notify the UE of various configuration information for the WUS through upper layer signaling (e.g., MIB, SIB, or RRC signaling) (see embodiments 1-1 and 1-2). On reception of the configuration information for the WUS, the UE may perform monitoring on the WUS. In the embodiment 1-3 of the disclosure, a method for the BS to activate or trigger the UE to perform monitoring on the WUS is proposed. One or more of the following embodiments of the disclosure may be used in combination.

Embodiment 1-3-1

The BS may notify the UE of configuration information for the WUS through upper layer signaling (e.g., MIB, SIB, or RRC signaling) (see embodiment 1). On reception of the configuration information for the WUS from the BS, the UE may perform monitoring on the WUS.

Embodiment 1-3-2

The BS may notify the UE of configuration information for the WUS through upper layer signaling (e.g., MIB, SIB, or RRC signaling). The BS may transmit an additional message to the UE to activate monitoring operation for the WUS in addition to the configuration information for the WUS. After receiving the message for activating WUS monitoring, the UE may perform monitoring on the WUS based on the configuration information for the WUS notified from the BS.

Figure 8A:
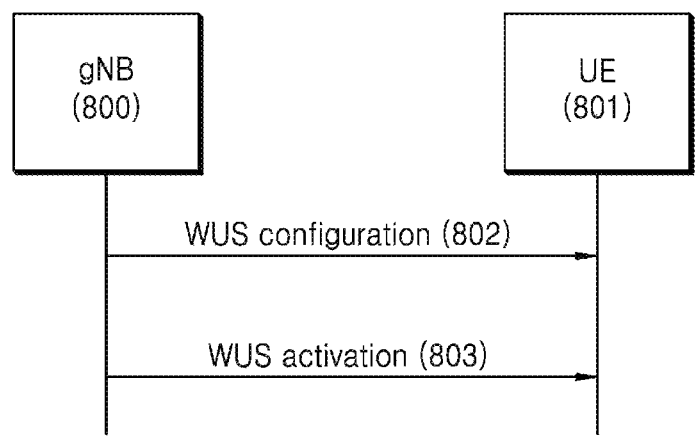
FIG. 8A shows a procedure between a base station and a user equipment, according to an embodiment of the disclosure.

FIG. 8A shows operations between a BS 800 and a UE 801, according to embodiment 1-3-2 of the disclosure.

In operation 802, the BS 800 may notify the UE 801 of configuration information for WUS through upper layer signaling (e.g., MIB, SIB, or RRC signaling). In operation 803, the BS 800 may additionally transmit a message to the UE 801 to activate monitoring on the WUS through upper layer signaling (e.g., RRC signaling or MAC CE signaling) or L1 signaling (e.g., DCI).

In operation 802, the UE 801 may receive the configuration information for WUS from the BS 800. In operation 803, the UE 801 may receive the additional message from the BS 800 to activate WUS monitoring. On reception of the message for activating WUS monitoring in operation 803, the UE 801 may perform monitoring on the WUS based on the configuration information for the WUS notified from the BS in operation 802.

In the embodiment 1-3-2 of the disclosure, by further introducing the monitoring activation message for WUS, the UE's monitoring on the WUS may be controlled to be performed at a time set by the BS.

Embodiment 1-3-3

The BS may notify the UE of configuration information for the WUS through upper layer signaling (e.g., MIB, SIB, or RRC signaling). The UE may transmit a message to the BS to request activation of WUS monitoring. On reception of the message to request activation of WUS monitoring from the UE, the BS may additionally transmit a message to the UE to activate WUS monitoring, enabling WUS monitoring at the UE to be activated.

Figure 8B:
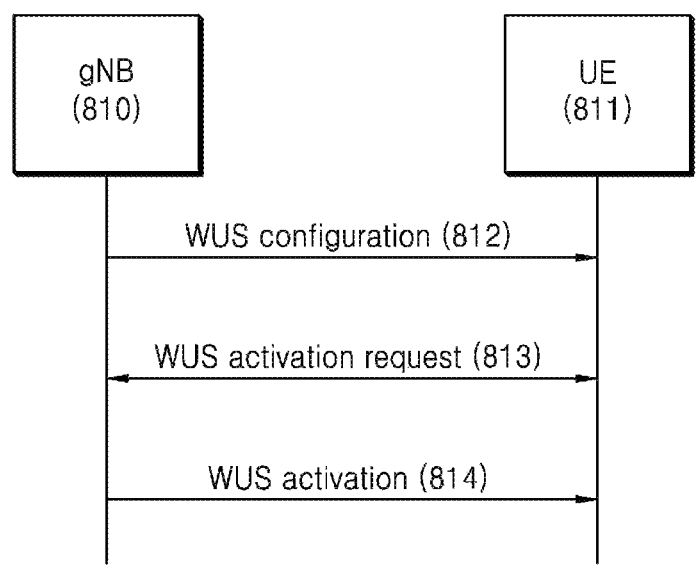
FIG. 8B shows a procedure between a base station and a user equipment, according to another embodiment of the disclosure.

FIG. 8B shows operations between a BS 810 and a UE 811, according to embodiment 1-3-3 of the disclosure.

In operation 812, the BS 810 may notify the UE 811 of configuration information for WUS through upper layer signaling (e.g., MIB, SIB, or RRC signaling). In operation 813, the UE 811 may transmit a message to the BS 810 for requesting activation of WUS monitoring through upper layer signaling (e.g., RRC signaling or MAC CE signaling) or L1 signaling (e.g., DCI). In operation 814, the BS 810 may additionally transmit a message to the UE 811 to activate monitoring on the WUS through upper layer signaling (e.g., RRC signaling or MAC CE signaling) or L1 signaling (e.g., DCI). On reception of the message for activating WUS monitoring in operation 814, the UE 801 may perform monitoring on the WUS based on the configuration information for the WUS notified from the BS in operation 812.

In the embodiment 1-3-3 of the disclosure, by introducing the operation of transmitting the WUS monitoring activation request message, the UE's monitoring on the WUS may be controlled to be performed at a time preferred by the UE.

Depending on implementations, operation 814 may be omitted in performing the embodiment 1-3-3 of the disclosure.

Embodiment 1-3-4

The BS may notify the UE of configuration information for the WUS through upper layer signaling (e.g., MIB, SIB, or RRC signaling). The BS may further configure the UE with a time value corresponding to a timer for WUS (referred to as WUS-InactivityTimer) through upper layer signaling (e.g., MIB, SIB, or RRC signaling). The UE may determine whether to perform monitoring on the WUS based on the timer WUS-InactivityTimer. For example, the UE may perform monitoring on the WUS when no DCI is detected for a particular period of time corresponding to WUS-InactivityTimer, i.e., until the timer is expired.

Figure 8C:
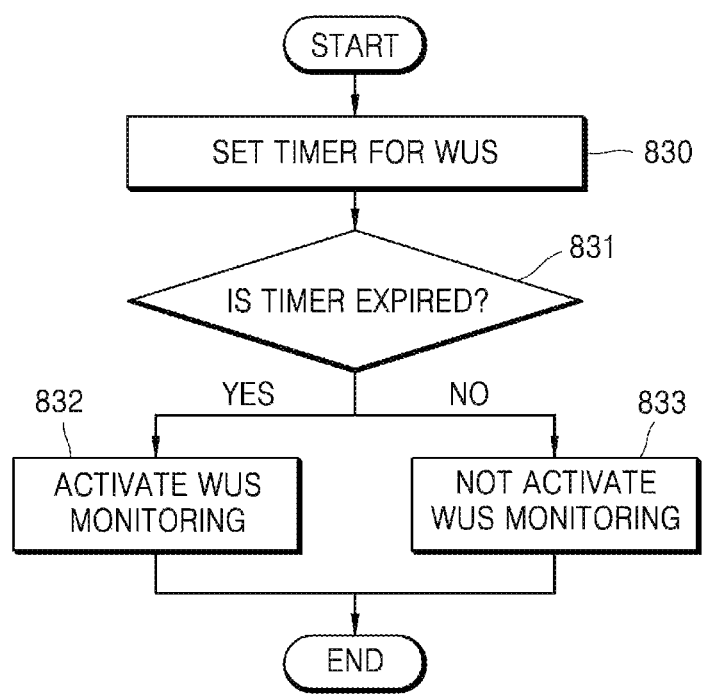
FIG. 8C illustrates a flowchart of a procedure for user equipment, according to an embodiment of the disclosure.

FIG. 8C illustrates a flowchart of UE operation, according to embodiment 1-3-4 of the disclosure. In operation 830, the UE may receive timer setting information, i.e., WUS-Inac-tivityTimer, from the BS through upper layer signaling (e.g., MIB, SIB, or RRC signaling). When configured with the WUS-InactivityTimer through the upper layer signaling, the UE may run the timer and increment the value of the timer at regular time intervals (e.g., 1 ms) when no DCI is detected. In operation 831, the UE may determine whether the timer has been expired (i.e., whether the time has reached the value of WUS-InactivityTimer). When the timer has been expired, the UE may perform monitoring on the WUS in operation 832. Otherwise, when the timer has not been expired, the UE may not perform monitoring on the WUS in operation 833.

In the embodiment 1-3-4 of the disclosure, by controlling WUS monitoring of the UE based on the timer, the BS may not transmit the PDCCH to the UE when there is no or little traffic to be transmitted to or received from the UE. Accordingly, the UE may perform unnecessary monitoring on the PDCCH as little as possible by performing WUS monitoring (operated in the low power mode) instead when no PDCCH is detected for more than a particular period of time.

Embodiment 1-3-5

The BS may notify the UE of configuration information for the WUS through upper layer signaling (e.g., MIB, SIB, or RRC signaling). In this case, the BS may configure the WUS in a particular BWP for the UE through upper layer signaling (e.g., MIB, SIB, or RRC signaling). In other words, the WUS may be associated with the particular BWP. The particular BWP associated with the WUS is referred to as a first BWP. When the first BWP is activated through a BWP activation message or BWP change message, the UE may start monitoring on the WUS that exists in the first BWP.

Figure 8D:
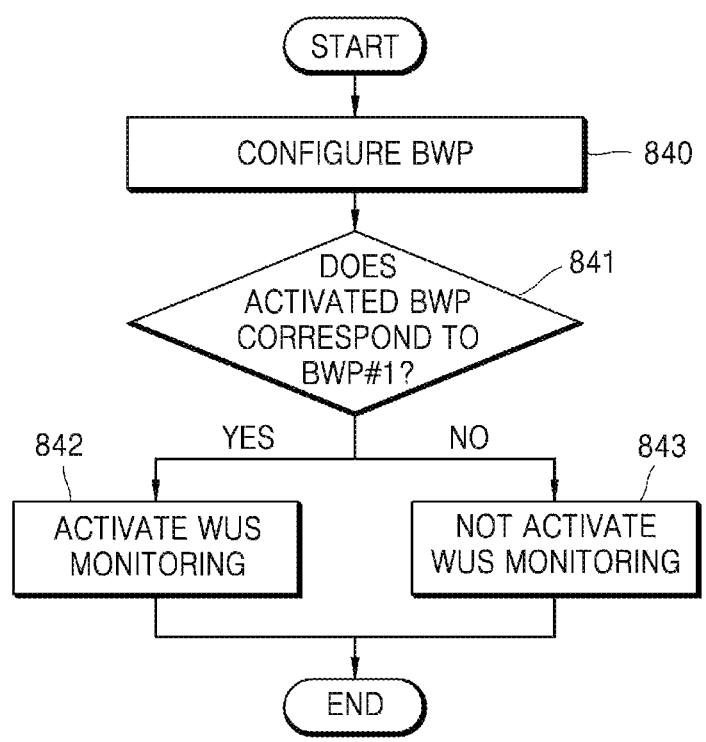
FIG. 8D illustrates a flowchart for a procedure for user equipment, according to another embodiment of the disclosure.

FIG. 8D illustrates a flowchart of UE operation, according to embodiment 1-3-5 of the disclosure. In operation 840, the UE may receive configuration information for BWP from the BS through upper layer signaling (e.g., MIB, SIB, or RRC signaling). In this case, the BS may configure the WUS in a particular BWP (the first BWP). The first BWP may correspond to at least one of the following BWPs.

the first BWP may correspond to the initial BWP.
  the first BWP may correspond to the default BWP.
  the first BWP may correspond to a BWP configured to have narrow bandwidth (less than X RBs).
  the first BWP may correspond to any of the configured BWPs.

In operation 841, the UE may determine whether to activate the first BWP. The first BWP may be activated through upper layer signaling (e.g., RRC signaling) or L1 signaling (e.g., DCI signaling), or in a timer-based method (in which the default BWP is activated when the timer is expired in a case that the first BWP corresponds to the default BWP). Specifically, the first BWP may be activated in the following operations:

the BS may configure one or more BWPs for the UE through upper layer signaling (e.g., MIB, SIB, or RRC signaling), and indicate a BWP to be activated to the UE through upper layer signaling (e.g., RRC signaling). The BWP to be activated for the first time through the RRC signaling may be indicated with FirstActiveDownlinkBWP/FirstActiveUplinkBWP. The UE may activate the BWP indicated through the RRC signaling among the configured BWPs.
  the BS may configure the UE with one or more BWPs through upper layer signaling (e.g., MIB, SIB, or RRC signaling), and indicate a BWP to be activated to the UE with a BWP indicator that exists in the L1 signaling, i.e., in the DCI. The UE may activate the BWP with an index indicated with the BWP indicator. When the BWP index indicated with the BWP indicator is different from an index of the currently activated BWP, the UE may activate a BWP indicated with the BWP indicator.

the BS may configure the UE with one or more BWPs through upper layer signaling (e.g., MIB, SIB, or RRC signaling), and set one of the BWPs as the default BWP. Furthermore, the BS may configure the UE with a timer for the default BWP (BWP-InactivityTimer). When the UE is operating in other BWP than the default BWP and has not detected DCI for a particular period of time in the currently activated BWP, (i.e., until BWP-InactivityTimer is expired), the UE may change the BWP to the default BWP.

When the first BWP is activated, the UE may start monitoring the WUS in operation 842. Otherwise, when the first BWP is not activated, the UE may not perform monitoring on the WUS in operation 843.

In the embodiment 1-3-5 of the disclosure, the BS may configure the UE with the WUS in a BWP with relatively narrow bandwidth, and thus enable the UE to operate in the narrow BWP while monitoring the WUS, thereby increasing the gain of reducing the power consumption of the UE.

Embodiment 1-3-6

The BS may notify the UE of configuration information for the WUS through upper layer signaling (e.g., MIB, SIB, or RRC signaling). The BS may further configure the UE with a time value corresponding to a timer for WUS (referred to as WUS-InactivityTimer) through upper layer signaling (e.g., MIB, SIB, or RRC signaling). The UE may determine whether to perform monitoring on the WUS based on the configured timers WUS-InactivityTimer and BWP-InactivityTimer. The timer used in determining whether to perform WUS monitoring is defined as InactivityTimer=min(WUS-InactivityTimer, BWP-InactivityTimer), where min (a, b) may be a function that outputs a smaller or equal value among a and b. For example, the UE may perform monitoring on the WUS when no DCI is detected for a particular period of time corresponding to InactivityTimer, i.e., until the timer is expired.

Embodiment 2

In the embodiment 2 of the disclosure, a method for the UE to monitor the WUS and a subsequent method for the UE to monitor the PDCCH are proposed.

Figure 9:
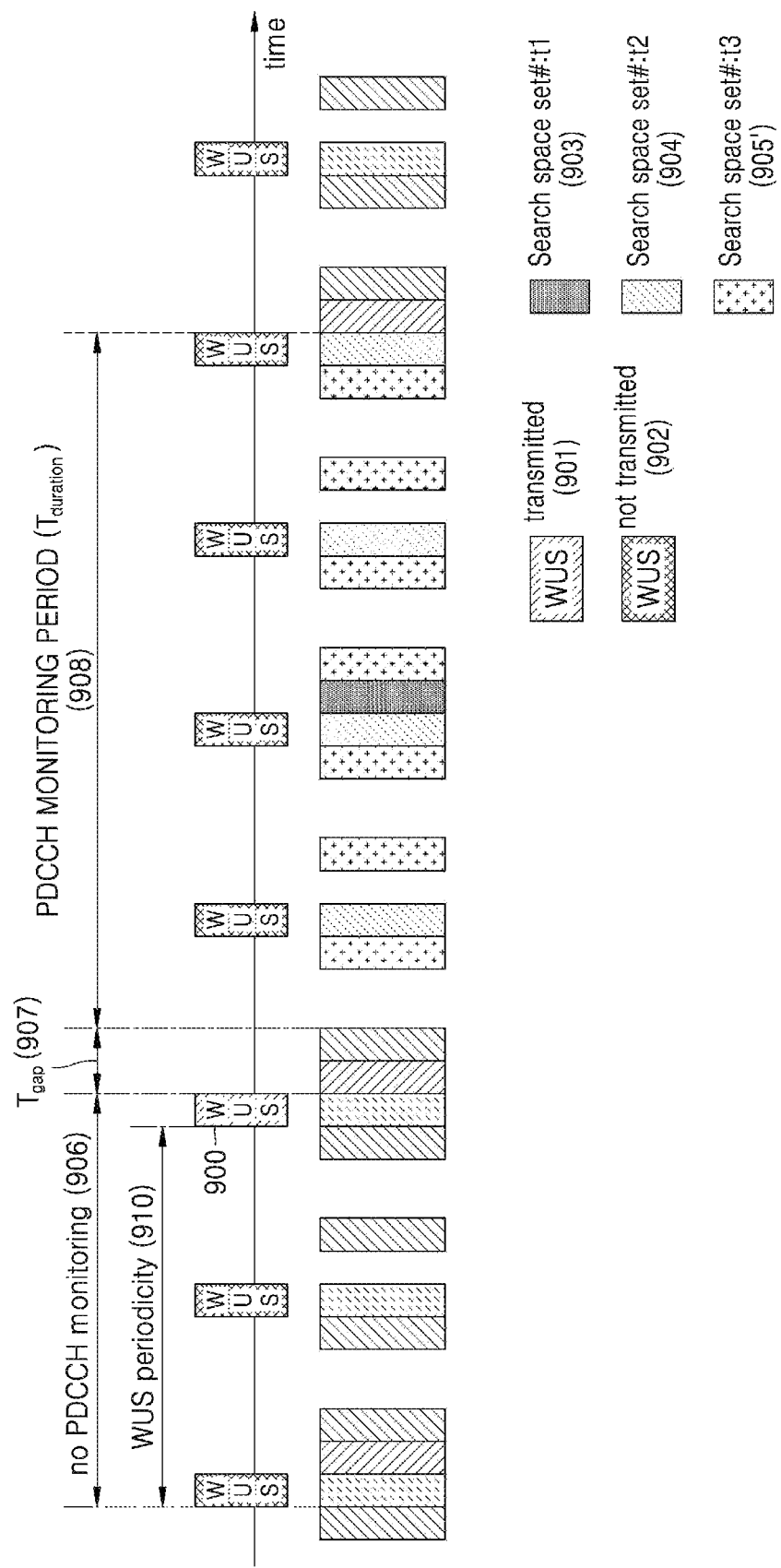
FIG. 9 shows an example of monitoring WUS and physical downlink control channel (PDCCH), according to an embodiment of the disclosure.

FIG. 9 shows an example of an operation for the UE to monitor WUS 900 and a subsequent operation for the UE to monitor a PDCCH, according to the embodiment 2 of the disclosure. In FIG. 9, an example of the UE monitoring the WUS 900 configured with certain periodicity 910 is shown. In the example of FIG. 9, the UE is configured with a plurality of search space sets, search space set #1 903, search space set #2 904, and search space set #3 905, and performs monitoring the PDCCH. The BS may or may not transmit the WUS 900 with the periodicity 910, in 901 or 902. The UE may monitor the WUS 900 with the set periodicity 910, and when no WUS is detected in 902, the UE may not perform PDCCH monitoring in 906. The UE may monitor the WUS 900 with the set periodicity 910, and when the WUS is detected in 901, the UE may monitor the PDCCH for the search space sets associated with the detected WUS 900 in particular time duration $T_{duration}$ (908) after a particular time gap $T_{gap}$ (907) after detecting the WUS 900. The WUS 900 may be associated with all or some of the configured search space sets. For example, when the WUS 900 is associated with all of the configured search space sets 903, 904, and 905, the UE may perform PDCCH monitoring for all the search space sets configured after $T_{gap}$(907) after detecting the WUS 900. In another example, when the WUS 900 is associated with some, e.g., search space set #1 903, of the configured search space sets, the UE may perform PDCCH monitoring for the search space set #1 903 after $T_{gap}$(907) after detecting the WUS 900.

Figure 10:
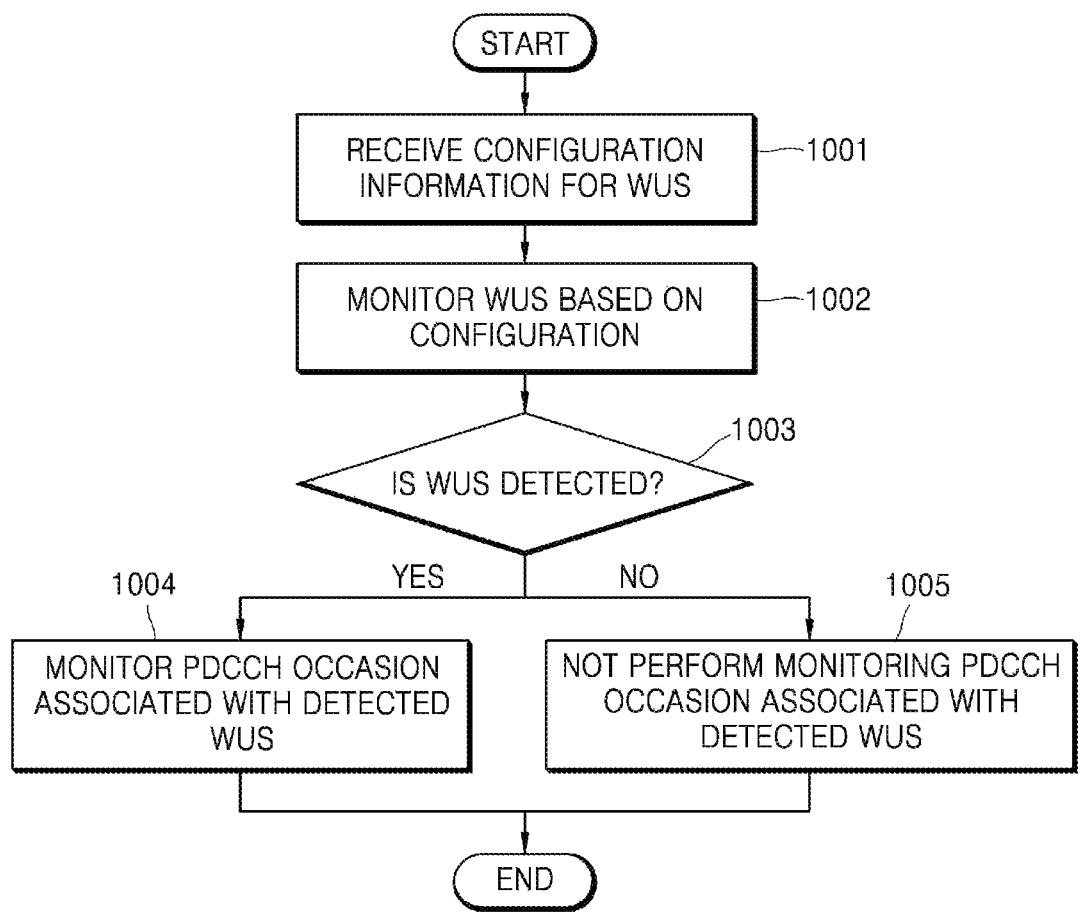
FIG. 10 illustrates a flowchart of operation of user equipment for monitoring WUS and PDCCH, according to an embodiment of the disclosure.

FIG. 10 illustrates a flowchart of UE's WUS monitoring operation and subsequent PDCCH monitoring operation.

In operation 1001, the UE may receive configuration information for WUS from the BS (see embodiment 1 of the disclosure). In operation 1002, the UE may perform WUS monitoring based on the configuration information received from the BS. In operation 1003, the UE may determine whether the WUS is detected. When it is determined that the WUS is detected, the UE may perform monitoring on an PDCCH occasion associated with the detected WUS, in operation 1004. The PDCCH occasion associated with the WUS may correspond to a PDCCH occasion determined based on a search space or search space set associated with the WUS, a control resource set, or a PDCCH monitoring interval according to discontinuous reception (DRX) settings (which may be determined based on drx-onDurationTimer and drx-InactivityTimer). When it is determined that the WUS is not detected, the UE may not perform monitoring on the PDCCH occasion associated with the detected WUS, in operation 1005.

Embodiments of the UE's WUS monitoring operation and subsequent PDCCH monitoring operation will now be described in detail.

Embodiment 2-1

A particular time gap $T_{gap}$ may be required between when a moment when the WUS is detected and a moment when the PDCCCH monitoring is started. While monitoring the WUS, the UE may restrictively use some functions to operate in the low power mode. For example, while monitoring the WUS, the UE may operate its radio frequency (RF) unit within very narrow bandwidth, and perform an operation of widening bandwidth for PDCCH monitoring after detecting the WUS, which may take some time. Or, it may take more than certain processing time to perform WUS monitoring and determine whether the WUS is detected. Hence, the UE may perform monitoring on the PDCCH that exists after $T_{gap}$ after detection of the WUS.

In the embodiment 2-1 of the disclosure, a method for determining $T_{gap}$ (907) is proposed. $T_{gap}$ (907) may be defined to be a time gap from the last symbol (or slot) of the detected WUS 900 to a first symbol (or slot) of the first PDCCH occasion monitored by the UE. Hence, the UE may perform monitoring on PDCCH occasions that exist after $T_{gap}$ after detection of the WUS 900. A minimum of $T_{gap}$ ($T_{gap,min}$≥0) may be predefined, or the UE may report a capability of the minimum $T_{gap}$ that the UE is able to support to the BS. $T_{gap}$ may always be equal to or greater than $T_{gap,min}$. $T_{gap}$ may be determined in at least one of the following methods:

[Method 1]

The BS may configure the UE with the value of $T_{gap}$ as part of the configuration information for WUS through upper layer signaling (e.g., MIB, SIB, or RRC signaling).

The UE may perform monitoring on PDCCH occasions that exist after $T_{gap}$ after detection of the WUS.

[Method 2]

The BS may configure the UE with the value of $T_{gap}$ for WUS through MAC CE signaling. The BS may configure the WUS for the UE, and transmit a message to activate (or trigger) monitoring on the configured WUS to the UE in the MAC CE, in which case, $T_{gap}$ may be included in the information transmitted in the MAC CE. The UE may perform monitoring on PDCCH occasions that exist after $T_{gap}$ after detection of the WUS. In Method 2, $T_{gap}$ may be dynamically changed for the WUS for which monitoring is activated in the MAC CE, and monitoring on unnecessary PDCCH occasions may be minimized as needed.

[Method 3]

The BS may configure the UE with the value of $T_{gap}$ for WUS through L1 signaling (e.g., in DCI). The BS may configure the WUS for UE, and transmit a message to activate (or trigger) monitoring on the configured WUS to the UE in the DCI, in which case, $T_{gap}$ may be included in the information transmitted in the DCI. The UE may perform monitoring on PDCCH occasions that exist after $T_{gap}$ after detection of the WUS. In Method 3, $T_{gap}$ may be dynamically changed for the WUS for which monitoring is activated in the DCI, and monitoring on unnecessary PDCCH occasions may be minimized as needed.

[Method 4]

The BS may indicate the value of $T_{gap}$ to the UE by using the WUS. The UE may obtain the value of $T_{gap}$ from the WUS after detecting the WUS, and perform monitoring on PDCCH occasions that exist after the $T_{gap}$ after detection of the WUS. In Method 4, $T_{gap}$ may be dynamically changed, and monitoring on unnecessary PDCCH occasions may be minimized as needed.

[Method 5]

$T_{gap}$ may be determined implicitly by the PDCCH occasion. After the WUS is detected, when it is assumed that a time between the last symbol (or slot) of the detected WUS and the first symbol (or slot) of the earliest occasion among the PDCCH monitoring occasions associated with the WUS that exists after the last symbol (or slot) of the detected WUS is $T_{gap,1}$, it may be determined that $T_{gap}=\min(T_{gap,min}, T_{gap,1})$. In Method 5, the UE may detect the WUS and then perform monitoring on the earliest PDCCH monitoring occasion that secures $T_{gap,min}$.

Embodiment 2-2

Referring to FIG. 9, the UE may perform monitoring on the PDCCH associated with the detected WUS 900 in the particular time duration $T_{duration}$(908) after the particular time gap $T_{gap}$ (907) after detecting the WUS 900. In the embodiment 2-2 of the disclosure, a method for determining $T_{duration}$ (908) is proposed. $T_{duration}$ may be determined in at least one of the following methods:

[Method 1]

The BS may configure the value of $T_{duration}$ for the UE as part of the configuration information for WUS through upper layer signaling (e.g., MIB, SIB, or RRC signaling). The UE may perform monitoring on the PDCCH in the time duration $T_{duration}$ after $T_{gap}$ after detection of the WUS.

[Method 2]

The BS may configure the value of $T_{duration}$ for WUS for the UE through MAC CE signaling. The BS may configure the WUS for the UE, and transmit a message to activate (or trigger) monitoring the configured WUS to the UE in the MAC CE, in which case, $T_{duration}$ may be included in the information transmitted in the MAC CE. The UE may perform monitoring on the PDCCH in the time duration $T_{duration}$ after $T_{gap}$ after detection of the WUS. In Method 2, the PDCCH monitoring interval for the WUS for which monitoring is activated may be dynamically changed by the MAC CE.

[Method 3]

The BS may indicate the value of $T_{duration}$ for WUS to the UE through L signaling (e.g., in DCI). The BS may configure the WUS for the UE, and transmit a message to activate (or trigger) monitoring on the configured WUS to the UE in the DCI, in which case, $T_{duration}$ may be included in the information transmitted in the DCI. The UE may perform monitoring on the PDCCH in the time duration $T_{duration}$ after the time $T_{gap}$ after detection of the WUS. In Method 3, the PDCCH monitoring interval for the WUS for which monitoring is activated may be dynamically changed by the DCI.

[Method 4]

The BS may indicate the value of $T_{duration}$ to the UE by using the WUS. The UE may obtain the value of $T_{duration}$ from the WUS after detecting the WUS, and perform monitoring on the PDCCH in the obtained time duration $T_{duration}$ after the time $T_{gap}$ after detection of the WUS. In Method 4, the PDCCH monitoring section may be dynamically changed by the WUS.

[Method 5]

The BS may additionally transmit an indicator, which is referred to as monitoring termination signal (MTS), to terminate PDCCH monitoring operation to the UE through upper layer signaling (e.g., MAC CE signaling) or L1 signaling (e.g., DCI, WUS, or GTS signaling). The UE may perform monitoring on the PDCCH after $T_{gap}$ after detection of the WUS until detecting the MTS. In Method 5, the PDCCH monitoring interval may be dynamically changed.

[Method 6]

The BS may indicate a time index (e.g., frame index, subframe index, slot index, symbol index, PDCCH occasion index, or the like) to the UE to perform PDCCH monitoring through upper layer signaling (e.g., MAC CE signaling) or L1 signaling (e.g., DCI, WUS, GTS signaling). For example, the BS may indicate a time index to perform PDCCH monitoring in a bitmap format. The UE may perform monitoring on PDCCH occasions that exist in the time index indicated by the BS after $T_{gap}$ after detection of the WUS.

[Method 7]

The UE may perform monitoring on the PDCCH after $T_{gap}$ after detection of the WUS. In the interval where the UE is monitoring the PDCCH after detecting the WUS, the BS may transmit a message to activate WUS monitoring to the UE through upper layer signaling (e.g., MAC CE) or L1 signaling (e.g., DCI, WUS, or GTS signaling). On reception of the message to activate WUS monitoring, the UE may terminate PDCCH monitoring and resume WUS monitoring.

Embodiment 2-3

Referring to FIG. 9, the UE may perform monitoring on the PDCCH associated with the detected WUS 900 in the particular time duration $T_{duration}$(908) after the particular time gap $T_{gap}$ (907) after detecting the WUS 900. The WUS 900 may be associated with all or some of the configured search space sets. In the example of FIG. 9, when the WUS 900 is associated with all of the configured search space sets 903, 904, and 905, the UE may perform PDCCH monitoring for all the search space sets configured after $T_{gap}$(907) after detecting the WUS 900. In another example, when the WUS 900 is associated with some, e.g., search space set #1 903, of the configured search space sets, the UE may perform PDCCH monitoring for the search space set #1 903 after $T_{gap}$(907) after detecting the WUS 900. The embodiment 2-3 of the disclosure proposes a method for determining association between the WUS and the search space set. Association between the WUS and the PDCCH monitoring occasion may be determined in at least one of the following methods:

[Method 1]

The WUS may be associated with all the configured search space sets. The UE may detect the WUS, and perform monitoring on all PDCCH occasions (i.e., all search space) that exist in the particular time duration $T_{duration}$ after particular time gap $T_{gap}$ after detection of the WUS.

[Method 2]

The WUS may be associated with a search space set among all the configured search space sets, which has the search space type set to USS. The UE may detect the WUS, and perform monitoring on a PDCCH occasion corresponding to the search space set with the search space type set to the USS that exists in the particular time duration $T_{duration}$ after the particular time gap $T_{gap}$ after detection of the WUS.

[Method 3]

The WUS may be associated with a search space set among all the configured search space sets, which has the search space type set to type-3 CSS or USS. The type-3 CSS may be defined as CSS in which a DCI format with the CRC scrambled by INT-RNTI, SFI-RNTI, TPC-PUSCH-RNTI, TPC-PUCCH-RNTI, TPC-SRS-RNTI, C-RNTI, CS-RNTI, or MCS-C-RNTI may be monitored. The UE may detect the WUS, and perform monitoring on a PDCCH occasion corresponding to the search space set with the search space type set to the type-3 CSS or USS that exists in the particular time duration $T_{duration}$ after the particular time gap $T_{gap}$ after detection of the WUS.

[Method 4]

The BS may notify the UE of one or more search space set indexes associated with the WUS as part of the configuration information for WUS through upper layer signaling (e.g., MIB, SIB, or RRC signaling). The UE may be configured by the BS with the search space set index information associated with the WUS. The UE may detect the WUS, and perform monitoring on PDCCH occasions corresponding to the search space sets associated with the detected WUS that exist in the particular time duration $T_{duration}$ after the particular time gap $T_{gap}$ after detection of the WUS.

[Method 5]

The BS may notify the UE of one or more search space set indexes associated with the WUS through MAC CE signaling. The BS may configure the WUS for the UE, and transmit a message to activate (or trigger) monitoring on the configured WUS to the UE in the MAC CE, in which case, the one or more search space set indexes associated with the WUS may be included in the information transmitted in the MAC CE. The UE may detect the WUS, and perform monitoring on PDCCH occasions corresponding to the search space sets associated with the detected WUS that exist in the particular time duration $T_{duration}$ after the particular time gap $T_{gap}$ after detection of the WUS.

[Method 6]

The BS may indicate one or more search space set indexes associated with the WUS to the UE through DCI signaling. The BS may configure the WUS for the UE, and transmit a message to activate (or trigger) monitoring on the configured WUS to the UE in the DCI, in which case, the one or more search space set indexes associated with the WUS may be included in the information transmitted in the DCI. The UE may detect the WUS, and perform monitoring on PDCCH occasions corresponding to the search space sets associated with the detected WUS that exist in the particular time duration $T_{duration}$ after the particular time gap $T_{gap}$ after detection of the WUS.

[Method 7]

The BS may indicate one or more search space set indexes associated with the WUS to the UE by using the WUS. The UE may detect the WUS, and then obtain information about the search space sets associated with the detected WUS. The UE perform monitoring on PDCCH occasions corresponding to the search space sets associated with the detected WUS that exist in the particular time duration $T_{duration}$ after the particular time gap $T_{gap}$ after detection of the WUS.

Embodiment 2-4

Referring to FIG. 9, the UE may perform monitoring on the PDCCH associated with the detected WUS 900 in the particular time duration $T_{duration}$(908) after the particular time gap $T_{gap}$ (907) after detecting the WUS 900. In the embodiment 2-4 of the disclosure, a method for performing monitoring on the PDCCH that is not associated with the WUS during the WUS monitoring is proposed. For example, the method may include at least one of the following methods:

[Method 1]

The UE may also perform monitoring on PDCCH occasions not associated with the WUS in the WUS monitoring interval. In other words, the UE may keep monitoring on the PDCCH occasions not associated with the WUS no matter whether the WUS is detected. The WUS may control the monitoring operation on the PDCCH occasions that are associated with the WUS, but may not affect the PDCCH occasions that are not associated with the WUS.

Specifically, referring to FIG. 9, when the WUS 900 is associated with the search space set #1 903 and not associated with the search space sets #2 904 and #3 905, the UE may keep monitoring the search space sets #2 904 and #3 905 no matter whether the WUS 900 is detected, while monitoring the WUS 900. In Method 1, no matter whether the WUS is detected, the UE may keep monitoring the search space set required to be continuously monitored (e.g., a search space set configured as CSS or type-3 CSS, or search space with higher priority requiring very low latency such as URLLC).

[Method 2]

The UE may not perform monitoring on the PDCCH occasions not associated with the WUS in the WUS monitoring interval. In other words, the UE's monitoring operation for the PDCCH may be controlled based on whether the WUS is detected. When some of all the search space sets are associated with the WUS, whether to perform PDCCH monitoring may be determined for the search space sets associated with the WUS while the UE is monitoring the WUS. In order for the BS to make the UE perform PDCCH monitoring for the search space sets not associated with the WUS, the BS may transmit a message to the UE to terminate the WUS monitoring. In other words, monitoring on the PDCCH occasions corresponding to the search space sets not associated with the WUS may be performed in a section other than the WUS monitoring interval.

Specifically, referring to FIG. 9, when the WUS 900 is associated with the search space set #1 903 and not associated with the search space sets #2 904 and #3 905, the UE may not perform monitoring on the search space sets #2 904 and #3 905 in the time interval for monitoring the WUS 900.

With Method 1, the UE may minimize unnecessary PDCCH monitoring, thereby maximizing power saving effect.

Embodiment 2-5

Referring to FIG. 9, the UE may perform monitoring on the PDCCH associated with the detected WUS 900 in the particular time duration $T_{duration}$ (908) after the particular time gap $T_{gap}$ (907) after detecting the WUS 900. In the embodiment 2-5 of the disclosure, a method for monitoring the WUS in the PDCCH monitoring interval, $T_{duration}$ (908), after detection of the WUS is proposed. For example, the method may include at least one of the following methods:

[Method 1]

The UE may not perform WUS monitoring in the duration $T_{duration}$. With Method 1, the UE may not perform unnecessary WUS monitoring, thereby maximizing power saving effect.

[Method 2]

The UE may keep performing WUS monitoring in the duration $T_{duration}$. When the UE performs WUS monitoring in the duration $T_{duration}$ and detects the WUS, the UE may perform at least one of the following operations.

(Operation 1)

The UE may perform WUS monitoring in the duration $T_{duration}$, and when detecting the WUS, may terminate PDCCH monitoring operation after a particular time gap $T_{gap,2}$. Specifically, when detecting the WUS again in the duration $T_{duration}$, the UE may determine the WUS as an MTS and terminate the monitoring operation for the PDCCH. In this case, the WUS signal monitored in the duration $T_{duration}$ may or may not be the same WUS signal that is monitored in other time section than $T_{duration}$.

(Operation 2)

The UE may perform WUS monitoring in the duration $T_{duration}$, and when detecting the WUS, may control PDCCH monitoring operation based on the configuration information included in the newly detected WUS. Specifically, the UE may detect the first WUS, and perform monitoring on PDCCH and WUS in the duration $T_{duration}$ after $T_{gap}$. When detecting the second WUS during the duration $T_{duration}$, the UE change configuration information-1 indicated in the WUS detected for the first time (e.g., configuration information that may be indicated in the WUS in the previous embodiments 2-1, 2-2, or 2-3, which may correspond to $T_{gap}$, $T_{duration}$, index of an associated search space set, etc.) to configuration information-2 indicated in the WUS detected for the second time (e.g., $T_{gap,2}$, $T_{duration,2}$, index of associated search space set, etc.) and newly apply the configuration information-2.

For example, when $T_{duration}$=10 (slots) is indicated in the WUS detected by the UE for the first time and $T_{duration}$=20 (slots) is indicated in the WUS detected for the second time, the UE may perform additional PDCCH monitoring in the duration $T_{duration}$=20 (slots) from the moment when the first WUS or the second WUS is detected. When the BS determines that traffic of the UE will keep increasing in the duration $T_{duration}$, the BS may additionally transmit an indicator to increase the duration T in the WUS transmitted in the duration $T_{duration}$, enabling the UE to keep monitoring the PDCCH.

For example, when $T_{duration}$=20 (slots) is indicated in the WUS detected by the UE for the first time and $T_{duration}$=10 (slots) is indicated in the WUS detected for the second time, the UE may perform PDCCH monitoring in the duration $T_{duration}$=10 (slots) from the moment when the first WUS or the second WUS is detected. When the BS determines that traffic of the UE will keep decreasing in the duration $T_{duration}$, the BS may additionally transmit an indicator to decrease the duration $T_{duration}$ in the WUS transmitted in the duration $T_{duration}$, enabling the UE to terminate the PDCCH monitoring earlier.

With Method 2, the UE's PDCCH monitoring operation may be more dynamically controlled.

[Method 3]

The BS may configure or instruct the UE to perform or not perform monitoring on the WUS in the duration $T_{duration}$ through upper layer signaling (e.g., MAC CE signaling) or L1 signaling (e.g., DCI or WUS signaling). The UE may be configured or instructed to perform or not perform monitoring on the WUS in the duration $T_{duration}$ through upper layer signaling (e.g., MAC CE signaling) or L1 signaling (e.g., DCI or WUS signaling), and may determine whether to perform monitoring on the WUS based on the notification from the BS.

[Method 4]

The UE may implicitly determine whether to perform or not perform the WUS monitoring in the duration $T_{duration}$, based on the configuration information for the WUS (e.g., WUS monitoring periodicity, $T_{duration}$, or the like).

For example, when the WUS monitoring periodicity is greater than a predefined or preset threshold, the UE may not perform the WUS monitoring in the duration $T_{duration}$. In another example, when the WUS monitoring periodicity is less than the predefined or preset threshold, the UE may not perform the WUS monitoring in the duration $T_{duration}$. In still another example, when the duration $T_{duration}$ is less than a predefined or preset threshold, the UE may not perform the WUS monitoring in the duration $T_{duration}$. In yet another example, when the duration $T_{duration}$ is greater than the predefined or preset threshold, the UE may not perform the WUS monitoring in the duration $T_{duration}$.

In the embodiments of the disclosure, of the power saving mode indicators, the WUS is focused, but the same is true for a case of using the GTS. For example, the BS may use the WUS to control the UE to perform PDCCH monitoring from the moment when the WUS is detected by the UE, or may use the GTC to control the UE not to perform PDCCH monitoring for a particular period of time from the moment when the GTS is detected by the UE. In the case of using the GTS, operations in the above WUS-based embodiments of the disclosure may be performed reversely.

Figure 11:
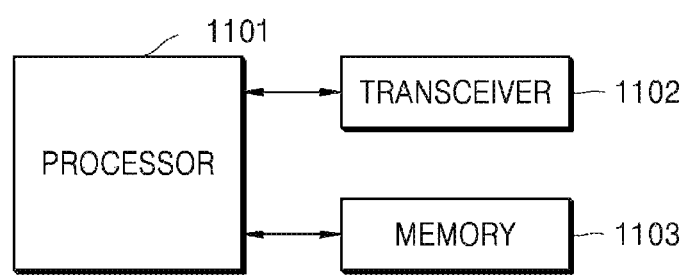
FIG. 11 illustrates a block diagram of user equipment, according to an embodiment of the disclosure.
Figure 12:
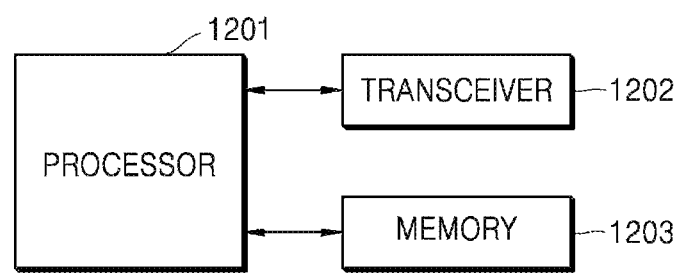
FIG. 12 illustrates a block diagram of a base station, according to an embodiment of the disclosure.

Transceivers, memories, and processors of the UE and BS to implement the embodiments of the disclosure are shown in FIGS. 11 and 12. Information may be exchanged between the BS and the UE to apply the PDCCH monitoring method in the 5G communication system, and the transceivers, memories, and processors of the BS and UE need to be operated according to the embodiments of the disclosure to perform the PDCCH monitoring method in the 5G communication system.

Specifically, FIG. 11 illustrates a block diagram of a UE, according to an embodiment of the disclosure. Referring to FIG. 11, the UE (or a terminal) may include a processor 1101, a transceiver 1102, and a memory 1103. Components of the UE are not, however, limited thereto. For example, the UE may include more or fewer elements than described above. In addition, the processor 1101, the transceiver 1102, and the memory 1103 may be implemented in a single chip.

In an embodiment of the disclosure, the processor 1101 may control a series of processes for the UE to be operated according to the embodiments of the disclosure. For example, the processor 1101 may control the components of the UE to perform the UE's WUS monitoring operation and PDCCH monitoring operation according to the embodiments of the disclosure. The processor 1101 may be provided in the plural, which may perform the WUS monitoring operation and the PDCCH monitoring operation as described above by carrying out a program stored in the memory 1103.

The transceiver 1102 may transmit or receive signals to or from the BS. The signals to be transmitted to or received from the BS may include control information and data. The transceiver 1102 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 1102 are not limited to the RF transmitter and RF receiver. In addition, the transceiver 1102 may receive a signal on a wireless channel and output the signal to the processor 1101, or transmit a signal output from the processor 1101 on a wireless channel.

In an embodiment of the disclosure, the memory 1103 may store a program and data required for operation of the UE. Furthermore, the memory 1103 may store control information or data included in a signal transmitted or received by the UE. The memory 1103 may include a storage medium such as a read only memory (ROM), a random access memory (RAM), a hard disk, a compact disc ROM (CD-ROM), and a digital versatile disc (DVD) or a combination of storage mediums. Moreover, the memory 1103 may be provided in the plural. In an embodiment of the disclosure, the memory 1103 may store a program for performing the WUS monitoring operation and the PDCCH monitoring operation as described above.

FIG. 12 illustrates a block diagram of a BS, according to an embodiment of the disclosure. Referring to FIG. 12, the BS may include a processor 1201, a transceiver 1202, and a memory 1203. Components of the BS are not, however, limited thereto. For example, the BS may include more or fewer elements than described above. In addition, the processor 1201, the transceiver 1202, and the memory 1203 may be implemented in a single chip.

The processor 1201 may control a series of processes for the BS to be operated according to the embodiments of the disclosure. For example, the processor 1201 may control the components of the BS to perform the WUS configuration method, the WUS transmission method, the PDCCH transmission method, etc., according to the embodiments of the disclosure.

The transceiver 1202 may transmit or receive signals to or from a UE. The signals to be transmitted to or received from the UE may include control information and data. The transceiver 1202 may include an RF transmitter for up-converting the frequency of a signal to be transmitted and amplifying the signal and an RF receiver for low-noise amplifying a received signal and down-converting the frequency of the received signal. It is merely an example, and the elements of the transceiver 1202 are not limited to the RF transmitter and RF receiver. In addition, the transceiver 1202 may receive a signal on a wireless channel and output the signal to the processor 1201, or transmit a signal output from the processor 1201 on a wireless channel. The processor 1201 may be provided in the plural, which may perform the WUS configuration method, the WUS transmission method, the PDCCH transmission method, etc., as described above by carrying out a program stored in the memory 1203.

In an embodiment of the disclosure, the memory 1203 may store a program and data required for operation of the BS. Furthermore, the memory 1203 may store control information or data included in a signal transmitted or received by the BS. The memory 1203 may include a storage medium such as a ROM, a RAM, a hard disk, a CD-ROM, and a DVD, or a combination of storage mediums. Moreover, the memory 1203 may be in the plural. In an embodiment of the disclosure, the memory 1203 may store a program to perform the WUS configuration method, the WUS transmission method, the PDCCH transmission method, etc., as described above. Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. Each of the memories may be provided in the plural.

The program may also be stored in an attachable storage device that may be accessed over a communication network including the Internet, an intranet, a Local Area Network (LAN), a wide LAN (WLAN), or a storage area network (SAN), or a combination thereof. The storage device may be connected, through an external port, to an apparatus performing the embodiments of the disclosure. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Embodiments of the disclosure provide an apparatus and method for effectively providing services in a mobile communication system.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure, which have been provided only for illustrative purposes. Furthermore, the embodiments of the disclosure may be operated by being combined with one another when necessary. For example, an embodiment of the disclosure and some of another embodiment of the disclosure may be combined to operate the BS and the UE. The embodiments of the disclosure may be equally applied to other communication systems, and other modifications of the embodiments may also be made without departing from the scope of the disclosure.

Although the present disclosure has been described with various embodiments, various changes and modifications may be suggested to one skilled in the art. It is intended that the present disclosure encompass such changes and modifications as fall within the scope of the appended claims

What is claimed is:

1. A method, performed by a user equipment (UE), the method comprising:
receiving, through a radio resource control (RRC) message, information about a search space to detect wake-up information from a base station;
monitoring, based on the information about the search space, a downlink control information (DCI) including the wake-up information; and
in case that the DCI including the wake-up information is detected, monitoring a physical downlink control channel (PDCCH) based on the wake-up information,
wherein the RRC message includes time gap information relative to start of the monitoring of the PDCCH, and
wherein the monitoring of the DCI including the wake-up information is based on the time gap information.

2. The method of claim 1, wherein the monitoring of the PDCCH comprises:
in case that the wake-up information indicates to perform monitoring on the PDCCH, monitoring the PDCCH for a predetermined period.

3. The method of claim 1, in case that the wake-up information indicates to not perform monitoring on the PDCCH, the PDCCH is not monitored for a predetermined period.

4. The method of claim 1, wherein a type of search space is a common search space (CSS).

5. A user equipment (UE) comprising:
a transceiver; and
at least one processor configured to:
receive, via the transceiver, information about a search space to detect wake-up information from a base station through a radio resource control (RRC) message;
monitor, based on the information about the search space, a downlink control information (DCI) including the wake-up information; and
in case that the DCI including the wake-up information is detected, monitor a physical downlink control channel (PDCCH) based on the wake-up information,
wherein the RRC message includes time gap information relative to start of the monitoring of the PDCCH, and
wherein, to monitor the DCI including the wake-up information, the at least one processor is configured to monitor the DCI based on the time gap information.

6. The UE of claim 5, wherein, to monitor the PDCCH based on the wake-up information, the at least one processor is configured to monitor the PDCCH for a predetermined period in case that the wake-up information indicates to perform monitoring on the PDCCH.

7. The UE of claim 5, wherein the PDCCH is not monitored for a predetermined period in case that the wake-up information indicates to not perform monitoring on the PDCCH.

8. The UE of claim 5, wherein a type of search space is a common search space (CSS).

9. A method, performed by a base station (BS), the method comprising:
transmitting, through a radio resource control (RRC) message, information about a search space to detect wake-up information to a user equipment (UE); and
transmitting a downlink control information (DCI) including the wake-up information,
wherein the DCI including the wake-up information is monitored based on the information about the search space,
wherein, in case that the DCI including the wake-up information is detected, a physical downlink control channel (PDCCH) is monitored based on the wake-up information,
wherein the RRC message includes time gap information relative to start of the monitoring of the PDCCH, and
wherein the DCI is monitored based on the time gap information.

10. The method of claim 9, wherein the PDCCH is monitored for a predetermined period in case that the wake-up information indicates to perform monitoring on the PDCCH.

11. The method of claim 9, wherein the PDCCH is not monitored for a predetermined period in case that the wake-up information indicates to not perform monitoring on the PDCCH.

12. The method of claim 9, wherein a type of search space is a common search space (CSS).

13. A base station (BS) comprising:
a transceiver; and
at least one processor configured to:
transmit, via the transceiver, information about a search space to detect wake-up information to a user equipment (UE), through a radio resource control (RRC) message; and
transmit, via the transceiver, a downlink control information (DCI) including the wake-up information,
wherein the DCI including the wake-up information is monitored based on the information about the search,
wherein, in case that the DCI including the wake-up information is detected, a physical downlink control channel (PDCCH) is monitored based on the wake-up information,
wherein the RRC message includes time gap information relative to start of the monitoring of the PDCCH, and
wherein the DCI is monitored based on the time gap information.

14. The BS of claim 13, wherein the PDCCH is monitored for a predetermined period in case that the wake-up information indicates to perform monitoring on the PDCCH.

15. The BS of claim 13, wherein the PDCCH is not monitored for a predetermined period in case that the wake-up information indicates to not perform monitoring on the PDCCH.

16. The BS of claim 13, wherein a type of search space is a common search space (CSS).

* * * * *